(12) United States Patent
Wang et al.

(10) Patent No.: US 10,312,825 B2
(45) Date of Patent: Jun. 4, 2019

(54) FIVE-LEVEL HALF BRIDGE INVERTER TOPOLOGY WITH HIGH VOLTAGE UTILIZATION RATIO

(71) Applicants: Hongliang Wang, Hefei (CN); Yan-Fei Liu, Kingston (CA)

(72) Inventors: Hongliang Wang, Hefei (CN); Yan-Fei Liu, Kingston (CA)

( * ) Notice: Subject to any disclaimer, the term of this patent is extended or adjusted under 35 U.S.C. 154(b) by 0 days.

(21) Appl. No.: 15/751,329

(22) PCT Filed: Aug. 15, 2016

(86) PCT No.: PCT/CN2016/095363
§ 371 (c)(1),
(2) Date: Feb. 8, 2018

(87) PCT Pub. No.: WO2017/028776
PCT Pub. Date: Feb. 23, 2017

(65) Prior Publication Data
US 2018/0241320 A1    Aug. 23, 2018

Related U.S. Application Data

(60) Provisional application No. 62/205,647, filed on Aug. 14, 2015.

(51) Int. Cl.
*H02M 7/5387* (2007.01)
*H02M 7/487* (2007.01)
*H02M 7/483* (2007.01)
*H02S 40/32* (2014.01)

(52) U.S. Cl.
CPC ......... *H02M 7/483* (2013.01); *H02M 7/5387* (2013.01); *H02S 40/32* (2014.12); *H02M 7/487* (2013.01)

(58) Field of Classification Search
CPC .......... H02M 7/04; H02M 7/12; H02M 7/217; H02M 7/219; H02M 7/42; H02M 7/44; H02M 7/48; H02M 7/483; H02M 7/487; H02M 7/537; H02M 7/5387; H02M 7/5388; H02M 7/797; H02S 40/32
See application file for complete search history.

(56) References Cited

U.S. PATENT DOCUMENTS

| | | | | |
|---|---|---|---|---|
| 2013/0301314 A1* | 11/2013 | Fu | ........................... | H02M 7/487 363/37 |
| 2015/0333522 A1* | 11/2015 | Wang | ..................... | H02M 7/483 307/43 |
| 2016/0043659 A1* | 2/2016 | Xu | ......................... | H02M 1/088 363/131 |
| 2018/0309383 A1* | 10/2018 | Wang | ..................... | H02M 7/483 |

* cited by examiner

Primary Examiner — Gary L Laxton
Assistant Examiner — Ivan Laboy

(57) ABSTRACT

A single phase five-level inverter topology comprising a half-bridge inverter circuit with a floating capacitor which outputs five mutually different voltage levels including zero, wherein both the system cost and the size is reduced, the leakage current is eliminated substantially and high efficiency is achieved by using five-level half-bridge structure with only one AC filtering inductor. A three-phase five-level inverter topology wherein the voltage utilization is twice that of the present three-phase five-level half-bridge inverter under the same operating conditions; the AC filtering inductance is smaller than that of the three-level half-bridge inverter; the DC link mid-point voltage can be balanced without additional circuitry.

25 Claims, 14 Drawing Sheets

FIVE-LEVEL HALF BRIDGE INVERTER TOPOLOGY WITH HIGH VOLTAGE UTILIZATION RATIO

RELATED APPLICATIONS

This application is a 35 U.S.C. 371 of International Application No. PCT/CN2016/095363, filed on Aug. 15, 2016, and claims the benefit of the filing date of U.S. Application No. 62/205,647, filed on Aug. 14, 2015, the contents of both applications being incorporated herein by reference in their entirety.

FIELD OF THE INVENTION

The invention relates to power converter topology, especially to five-level inverter topology.

BACKGROUND

With the increasing threat of global energy and serious environmental problem, the renewable energy has been developing fast. Photovoltaic industry has an extensive future as its resources are plentiful and widespread. It is an important issue to lower cost and improve efficiency for photovoltaic system.

It is known that photovoltaic arrays yield DC power. Inverter is used to convert DC from photovoltaic arrays into AC in photovoltaic system. There is a common mode loop circuit in the photovoltaic inverter system without a transformer. The high frequency leakage current in the loop circuit leads to electromagnetic interference, and at the same time, it is dangerous to devices and human. So the high frequency leakage current becomes a critical issue to be solved for the transformerless inverter system.

Inverters are divided into two kinds according to the circuit structure.

The first kind of inverter is symmetry in topology and it has double AC filtering inductors. Full bridge inverter circuit is usually of this kind. No additional circuit in the full bridge inverter circuit is needed to boost input voltage in many cases since it is enough for half of that of the half-bridge. But it is difficult for the full bridge inverter to cancel substantially the high frequency leakage current because of the parasitic parameters within the inverter system. The improvements of conventional H4 full bridge circuit are made to reduce the high frequency leakage current so that it meets the industry standard. However, its cost is high because the two AC filtering inductors' magnetic cores are not common for the symmetry mode. In addition, cost is high because of double AC filtering inductors.

The second kind of inverter is non-symmetry and it has single AC filtering inductor. Half bridge and mid-point clamped inverter circuits are examples of this kind. One terminal of AC utilities or AC load is connected with the mid-point of DC input voltage for the single phase inverter. The parasitic capacitor voltage is constant so that the leakage current is eliminated substantially. However, it needs an additional circuit to increase the input voltage as the voltage utilization ratio of the half bridge based inverter (the second kind) is half of that of a full bridge based inverter (the first kind). This additional circuit reduces the system efficiency and increases the system cost.

For the three-phase inverter system, three-level half-bridge inverter is often used. However, its cost is high because (1) the voltage utilization is low, (2) the AC filtering inductance is high and (3) additional circuitry is needed to increase the input DC voltage.

SUMMARY

To solve the above problems, provided in the invention is five-level inverter topology. For the sake of brevity, the term "bidirectional switch" as used herein is intended to refer to a semiconductor switch where the current can flow in both directions and withstand voltage in one direction, such as IGBT with a parallel diode, or MOSFET where the parallel diode is inherent.

The five-level inverter topology is used with a first DC power supply and a second DC power supply. The negative terminal of the first DC power supply is connected to the positive terminal of the second DC power supply. The five-level inverter topology at least comprises a half-bridge inverter circuit that outputs five mutually different voltage levels including zero; wherein the half-bridge inverter circuit at least comprises a floating capacitor that is charged by the first DC power supply or the second DC power supply; either the first DC power supply or the second DC power supply provides power for the half-bridge inverter circuit, or the first DC power supply or the second DC power supply alternatively added algebraically to the floating capacitor provides power for the half-bridge inverter circuit.

In some implementation, these two DC power supplies are implemented by another DC power supply in parallel with two capacitors connected in series. Each capacitor acts as a DC power supply.

According to a first aspect of the invention, there is provided a first kind of single phase five-level inverter topology. It comprises a half-bridge inverter circuit that outputs five mutually different voltage levels including zero.

The half-bridge inverter circuit provided in the invention comprises a floating capacitor, a circuit module, a first switching circuit branch, a second switching circuit branch, a third switching circuit branch, a fourth switching circuit branch, a fifth switching circuit branch and a sixth switching circuit branch.

The circuit module in the half-bridge inverter circuit comprises a first terminal, a second terminal, a third terminal, a fourth terminal and a fifth terminal. There is at least one circuit branch between any two of the five terminals of the circuit module. The first terminal of the circuit module is connected to the common terminal of the two DC power supplies. The fourth terminal of the circuit module is connected to the positive terminal of the first DC power supply and the fifth terminal is connected to the negative terminal of the second DC power supply.

The first terminal of the first switching circuit branch is connected to the positive terminal of the first DC power supply and the second terminal is connected to the first terminal of the second switching circuit branch whose second terminal is connected to the negative terminal of the second DC power supply. The first terminal of the third switching circuit branch is connected to both the second terminal of the circuit module and the positive terminal of the floating capacitor. The second terminal of the third switching circuit branch is connected to the first terminal of the fourth switching circuit branch whose second terminal is connected to both the third terminal of the circuit module and the negative terminal of the floating capacitor. The common terminal of the third and the fourth switching circuit branches is connected to the common terminal of the first and the second switching circuit branches. The first terminal of the fifth switching circuit branch is connected to the positive terminal of the floating capacitor and the second terminal is connected to the first terminal of the sixth switching circuit branch whose second terminal is connected to the negative terminal of the floating capacitor. The common terminal of the fifth and the sixth switching circuit branches is connected to a first terminal of AC utilities or AC load.

In some embodiments, the first kind of single phase five-level inverter topology further comprises a first inductor (i.e. an AC filtering inductor) which is connected between the common terminal of the fifth and the sixth switching circuit branches and the first terminal of AC utilities or AC load. The first inductor is used to filter the waveform.

In some embodiments, the common terminal of the two DC power supplies is connected to a second terminal of AC utilities or AC load.

In some embodiments, the first switching circuit branch comprises a first bidirectional switch; the second switching circuit branch comprises a second bidirectional switch; the third switching circuit branch comprises a third bidirectional switch; the fourth switching circuit branch comprises a fourth bidirectional switch; the fifth switching circuit branch comprises a fifth bidirectional switch; the sixth switching circuit branch comprises a sixth bidirectional switch. The first terminal of each bidirectional switch is connected to the first terminal of the switching circuit branch in which it is located. The second terminal of each bidirectional switch is connected to the second terminal of the switching circuit branch in which it is located.

In some embodiments, the circuit branch which is connected between the first terminal and the second terminal of the circuit module or between the first terminal and the third terminal comprises at least one bidirectional switch.

In some embodiments, the circuit module further comprises a current limiting device, such as an inductor, resistor, semiconductor device operated at active mode or linear mode, or the combination of the above devices. The current limiting device is used to limit the surge current when the floating capacitor is charged.

In some embodiments, the circuit module comprises a second inductor, a seventh bidirectional switch, an eighth bidirectional switch, a first diode, a second diode, a third diode and a fourth diode.

The cathode of the first diode is connected to the fourth terminal of the circuit module and the anode of the first diode is connected to the cathode of the second diode. The anode of the second diode is connected to the fifth terminal of the circuit module. The first terminal of the second inductor is connected to the first terminal of the circuit module and the second terminal is connected to the common terminal of the first and the second diodes. The anode of the third diode is connected to that of the first diode. The cathode of the third diode is connected to the first terminal of the seventh bidirectional switch whose second terminal is connected to the second terminal of the circuit module. The cathode of the fourth diode is connected to that of the second diode and the anode is connected to the second terminal of the eighth bidirectional switch whose first terminal is connected to the third terminal of the circuit module.

In some embodiments, the circuit module comprises a second inductor, a seventh bidirectional switch, a first diode, a second diode, a third diode, a fourth diode, a fifth diode and a sixth diode.

The cathode of the first diode is connected to the fourth terminal of the circuit module and the anode of the first diode is connected to the cathode of the second diode. The anode of the second diode is connected to the cathode of the third diode. The anode of the third diode is connected to the cathode of the fourth diode whose anode is connected to the fifth terminal of the circuit module. The first terminal of the second inductor is connected to the first terminal of the circuit module and the second terminal is connected to the common terminal of the third and the second diodes. The cathode of the fifth diode is connected to both the cathode of the second diode and the first terminal of the seventh bidirectional switch. The anode of the fifth diode is connected to the third terminal of the circuit module. The anode of the sixth diode is connected to both the anode of the third diode and the second terminal of the seventh bidirectional switch. The cathode of the sixth diode is connected to the second terminal of the circuit module.

In some embodiments, the circuit module comprises a second inductor, a seventh bidirectional switch, an eighth bidirectional switch, a ninth bidirectional switch, a tenth bidirectional switch, a first diode and a second diode.

The cathode of the first diode is connected to the fourth terminal of the circuit module and the anode of the first diode is connected to the cathode of the second diode. The anode of the second diode is connected to the fifth terminal of the circuit module. The first terminal of the second inductor is connected to the first terminal of the circuit module and the second terminal of the second inductor is connected to the common terminal of the first and the second diodes. The second terminal of the seventh bidirectional switch is connected to the anode of the first diode. The first terminal of the seventh bidirectional switch is connected to the first terminal of the eighth bidirectional switch whose second terminal is connected to the second terminal of the circuit module. The first terminal of the ninth bidirectional switch is connected to the cathode of the second diode and the second terminal is connected to the second terminal of the tenth bidirectional switch whose first terminal is connected to the third terminal of the circuit module.

In some embodiments, the circuit module comprises a second inductor, a seventh bidirectional switch, an eighth bidirectional switch, a first diode, a second diode, a third diode, a fourth diode, a fifth diode, a sixth diode, a seventh diode, an eighth diode, a ninth diode and a tenth diode.

The cathode of the first diode is connected to the fourth terminal of the circuit module and the anode of the first diode is connected to the cathode of the second diode. The anode of the second diode is connected to the fifth terminal of the circuit module. The first terminal of the second inductor is connected to the first terminal of the circuit module and the second terminal of the second inductor is connected to the common terminal of the first and the second diodes.

The cathode of the third diode is connected to both the cathode of the fifth diode and the first terminal of the seventh bidirectional switch. The anode of the third diode is connected to the cathode of the fourth diode whose anode is connected to both the anode of the sixth diode and the second terminal of the seventh bidirectional switch. The common terminal of the third and the fourth diodes is connected to the anode of the first diode. The anode of the fifth diode is connected to the cathode of the sixth diode. The common terminal of the fifth and the sixth diodes is connected to the second terminal of the circuit module.

The cathode of the seventh diode is connected to both the cathode of the ninth diode and the first terminal of the eighth bidirectional switch. The anode of the seventh diode is connected to the cathode of the eighth diode whose anode is connected to both the anode of the tenth diode and the second terminal of the eighth bidirectional switch. The common terminal of the seventh and the eighth diodes is connected to the cathode of the second diode. The anode of the ninth diode is connected to the cathode of the tenth diode. The common terminal of the ninth and the tenth diodes is connected to the third terminal of the circuit module.

In some embodiments, the circuit module comprises a second inductor, a seventh bidirectional switch, an eighth bidirectional switch, a first diode, a second diode, a third diode, a fourth diode, a fifth diode, a sixth diode, a seventh diode, an eighth diode, a ninth diode and a tenth diode.

The cathode of the first diode is connected to the fourth terminal of the circuit module and the anode of the first diode is connected to the cathode of the third diode. The anode of the third diode is connected to the cathode of the fourth diode. The cathode of the third diode is connected to both the cathode of the fifth diode and the first terminal of the seventh bidirectional switch. The anode of the fourth diode is connected to both the anode of the sixth diode and the second terminal of the seventh bidirectional switch. The anode of the fifth diode is connected to the cathode of the sixth diode. The common terminal of the fifth and the sixth diodes is connected to the second terminal of the circuit module.

The cathode of the seventh diode is connected to both the cathode of the ninth diode and the first terminal of the eighth bidirectional switch. The anode of the seventh diode is connected to the cathode of the eighth diode. The anode of the eighth diode is connected to both the anode of the tenth diode and the second terminal of the eighth bidirectional switch. The anode of the ninth diode is connected to the cathode of the tenth diode. The common terminal of the tenth and the ninth diodes is connected to the third terminal of the circuit module. The anode of the eighth diode is connected to the cathode of the second diode whose anode is connected to the fifth terminal of the circuit module.

The first terminal of the second inductor is connected to the first terminal of the circuit module and the second terminal of the second inductor is connected to both the common terminal of the third and the fourth diodes and the common terminal of the seventh and the eighth diodes.

According to a second aspect of the invention, there is provided a second kind of single phase five-level inverter topology. It comprises a half-bridge inverter circuit that outputs five mutually different voltage levels including zero.

The half-bridge inverter circuit provided in the invention comprises a floating capacitor, a circuit module, a first switching circuit branch, a second switching circuit branch, a third switching circuit branch, a fourth switching circuit branch, a fifth switching circuit branch and a sixth switching circuit branch.

The circuit module in the half-bridge inverter circuit comprises a first terminal, a second terminal and a third terminal. There is at least one circuit branch between any two terminals. The first terminal of the circuit module is connected to the common terminal of the two DC power supplies.

The first terminal of the first switching circuit branch is connected to the positive terminal of the first DC power supply and the second terminal is connected to the first terminal of the second switching circuit branch whose second terminal is connected to the negative terminal of the second DC power supply. The first terminal of the third switching circuit branch is connected to both the second terminal of the circuit module and the positive terminal of the floating capacitor. The second terminal of the third switching circuit branch is connected to the first terminal of the fourth switching circuit branch whose second terminal is connected to both the third terminal of the circuit module and the negative terminal of the floating capacitor. The common terminal of the third and the fourth switching circuit branches is connected to the common terminal of the first and the second switching circuit branches. The first terminal of the fifth switching circuit branch is connected to the positive terminal of the floating capacitor and the second terminal is connected to the first terminal of the sixth switching circuit branch whose second terminal is connected to the negative terminal of the floating capacitor. The common terminal of the fifth and the sixth switching circuit branches is connected to a first terminal of AC utilities or AC load.

In some embodiments, the second kind of single phase five-level inverter topology further comprises a first inductor (i.e., an AC filtering inductor) which is connected between the common terminal of the fifth and the sixth switching circuit branches and the first terminal of AC utilities or AC load. The first inductor is used to filter the waveform.

In some embodiments, the common terminal of the two DC power supplies is connected to the second terminal of AC utilities or AC load.

In some embodiments, the first switching circuit branch comprises a first bidirectional switch; the second switching circuit branch comprises a second bidirectional switch; the third switching circuit branch comprises a third bidirectional switch; the fourth switching circuit branch comprises a fourth bidirectional switch; the fifth switching circuit branch comprises a fifth bidirectional switch; and the sixth switching circuit branch comprises a sixth bidirectional switch. The first terminal of each bidirectional switch is connected to the first terminal of the switching circuit branch in which it is located. The second terminal of each bidirectional switch is connected to the second terminal of the switching circuit branch in which it is located.

In some embodiments, the circuit branch which is connected between the first terminal and the second terminal of the circuit module or between the first terminal and the third terminal comprises at least one bidirectional switch.

In some embodiments, the circuit module further comprises a current limiting device, such as an inductor, resistor, semiconductor device operated at active mode or linear mode, or the combination of the above devices. The current limiting device is used to limit the surge current when the floating capacitor is charged.

In some embodiments, the circuit module comprises a second inductor, a seventh bidirectional switch, an eighth bidirectional switch, a ninth bidirectional switch, a tenth bidirectional switch, a first diode and a second diode.

The first terminal of the seventh bidirectional switch is connected to both that of the ninth bidirectional switch and the cathode of the first diode. The second terminal of the ninth bidirectional switch is connected to the second terminal of the circuit module. The second terminal of the seventh bidirectional switch is connected to the first terminal of the eighth bidirectional switch whose second terminal is connected to both the anode of the second diode and the second terminal of the tenth bidirectional switch. The first terminal of the tenth bidirectional switch is connected to the third terminal of the circuit module. The anode of the first diode is connected to the cathode of the second diode.

One terminal of the second inductor is connected to both the common terminal of the seventh and the eighth bidirectional switches and the first terminal of the circuit module, and the other terminal is connected to the common terminal of the first and the second diodes.

In some embodiments, the circuit module comprises a second inductor, a seventh bidirectional switch, an eighth bidirectional switch, a ninth bidirectional switch, a first diode, a second diode, a third diode and a fourth diode.

The first terminal of the seventh bidirectional switch is connected to both that of the ninth bidirectional switch and the cathode of the first diode. The second terminal of the seventh bidirectional switch is connected to the first terminal of the eighth bidirectional switch whose second terminal is connected to both the anode of the second diode and the second terminal of the ninth bidirectional switch. The anode of the first diode is connected to the cathode of the second diode. The cathode of the third diode is connected to the first terminal of the ninth bidirectional switch and the anode is connected to the third terminal of the circuit module. The anode of the fourth diode is connected to the second terminal of the ninth bidirectional switch and the cathode is connected to the second terminal of the circuit module.

One terminal of the second inductor is connected to both the common terminal of the seventh and the eighth bidirectional switches and the first terminal of the circuit module, and the other terminal is connected to the common terminal of the first and the second diodes.

In some embodiments, the circuit module comprises a second inductor, a seventh bidirectional switch, an eighth bidirectional switch, a ninth bidirectional switch, a tenth bidirectional switch, an eleventh bidirectional switch and a twelfth bidirectional switch.

The first terminal of the seventh bidirectional switch is connected to both that of the ninth bidirectional switch and that of the eleventh bidirectional switch. The second terminal of the seventh bidirectional switch is connected to the first terminal of the eighth bidirectional switch whose second terminal is connected to both the second terminal of the tenth bidirectional switch and the second terminal of the twelfth bidirectional switch. The second terminal of the ninth bidirectional switch is connected to the first terminal of the tenth bidirectional switch. The second terminal of the eleventh bidirectional switch is connected to the second terminal of the circuit module. The first terminal of the twelfth bidirectional switch is connected to the third terminal of the circuit module.

One terminal of the second inductor is connected to both the common terminal of the seventh and the eighth bidirectional switches and the first terminal of the circuit module, and the other terminal is connected to the common terminal of the ninth and the tenth bidirectional switches.

In some embodiments, the circuit module comprises a second inductor, a seventh bidirectional switch, an eighth bidirectional switch, a ninth bidirectional switch, an tenth bidirectional switch, a first diode, a second diode, a third diode, a fourth diode, a fifth diode, a sixth diode, a seventh diode and an eighth diode.

The first terminal of the seventh bidirectional switch is connected to both that of the ninth bidirectional switch and the cathode of the first diode. The second terminal of the seventh bidirectional switch is connected to the first terminal of the eighth bidirectional switch whose second terminal is connected to both the second terminal of the tenth bidirectional switch and the anode of the sixth diode.

The anode of the first diode is connected to the cathode of the second diode. The anode of the second diode is connected to both the anode of the fourth diode and the second terminal of the ninth bidirectional switch. The cathode of the third diode is connected to the first terminal of the ninth bidirectional switch and the anode of the third diode is connected to both the cathode of the fourth diode and the second terminal of the circuit module.

The cathode of the fifth diode is connected to both the first terminal of the tenth bidirectional switch and the cathode of the seventh diode. The anode of the fifth diode is connected to the cathode of the sixth diode. The anode of the seventh diode is connected to both the cathode of the eighth diode and the third terminal of the circuit module. The anode of the eighth diode is connected to the second terminal of the tenth bidirectional switch.

One terminal of the second inductor is connected to both the first terminal of the circuit module and the common terminal of the seventh and the eighth bidirectional switches, and the other terminal of the second inductor is connected to both the common terminal of the first and the second diodes and the common terminal of the sixth and the fifth diodes.

According to a third aspect of the invention, there is provided a first kind of three-phase five-level inverter topology. It comprises three single phase five-level inverter topologies provided in the first aspect of the invention. The three single phase five-level inverter topologies are connected in parallel at their input sides. The AC output terminals of the three single phase five-level inverter topologies are respectively connected to three phases of AC utilities or AC load.

According to a fourth aspect of the invention, there is provided a second kind of three-phase five-level inverter topology. It comprises three single phase five-level inverter topologies provided in the second aspect of the invention. The three single phase five-level inverter topologies are connected in parallel at their input sides. The AC output terminals of the three single phase five-level inverter topologies are respectively connected to three phases of AC utilities or AC load.

According to a fifth aspect of the invention, there is provided a third kind of three-phase five-level inverter topology. It comprises three single phase five-level inverter topologies which are random combination of those provided in the first aspect and those provided in the second aspect of the invention. That is to say, it comprises one single phase five-level inverter topology provided in the first aspect of the invention and two single phase five-level inverter topologies provided in the second aspect of the invention; or it comprises two single phase five-level inverter topologies provided in the first aspect of the invention and one single phase five-level inverter topology provided in the second aspect of the invention. The three single phase five-level inverter topologies are connected in parallel at their input sides. The AC output terminals of the three single phase five-level inverter topologies are respectively connected to three phases of AC utilities or AC load.

Disclosed is single phase five-level inverter topology comprising a half-bridge inverter circuit with a floating capacitor which outputs five mutually different voltage levels including zero, wherein both the system cost and the size is reduced, the leakage current is eliminated substantially and high efficiency is achieved by using five-level half-bridge structure with only one AC filtering inductor. Provided also is three-phase five-level inverter topology wherein the voltage utilization ratio is twice that of the present three-phase five-level half-bridge inverter under the same operating conditions by using the floating capacitor; the AC filtering inductance is smaller than that of the three-level half-bridge inverter because of the five-level structure; the mid-point voltage of the two DC power supplies (especially two serially combining capacitors connected in parallel to one DC power supply) is balanced as they alternatively charging the floating capacitor with an equality of opportunity. That is to say, the DC link mid-point voltage can be balanced without additional circuitry.

The five-level inverter topology provided in the invention can be used for, but not limited to, renewable energy power system, such as single-phase or three-phase photovoltaic system.

BRIEF DESCRIPTION OF THE DRAWINGS

In order to clearly present this invention, the circuit implementations discussed in the invention are accompanied with the following drawing.

FIG. 24 (b) is the circuit diagram in partial block form of a three-phase five-level inverter topology based on the equivalent circuit in FIG. 24(a) according to an embodiment of the invention.

FIG. 25 (b) is the circuit diagram in partial block form of a three-phase five-level inverter topology based on the equivalent circuit in FIG. 25(a) according to an embodiment of the invention.

FIG. 26 (b) is the circuit diagram in partial block form of a second three-phase five-level inverter topology based on the equivalent circuit in FIG. 24(a) and FIG. 25(a) according to an embodiment of the invention.

For convenience in description, identical components have been given the same reference numbers in the various drawings. The same symbols like "V" as used in one drawing are intended to refer to be connected with each other.

DETAILED DESCRIPTION OF EMBODIMENTS

Figure 1:
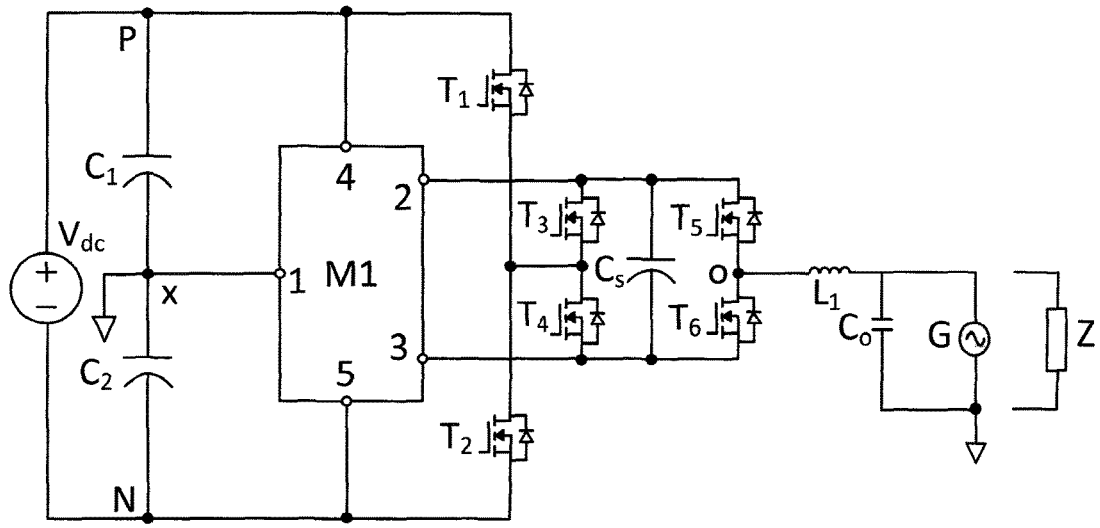
FIG. 1 is a circuit diagram in partial block form of a first kind of single phase five-level inverter topology according to an embodiment of the invention.

Provided herein is five-level inverter topology. For a better understanding of the invention, and to show more clearly how it may be carried into effect, embodiments will be described in detail with reference of the accompanying drawings. Of course, the embodiments described below are part of the invention examples, not all of them. Those skilled in the art will recognize or be able to ascertain variants of the embodiments described herein. Such variants are within the scope of the invention and are covered by the appended claims.

As shown in figures below, the term Vdc is DC power supply voltage, M1 or M2 is the circuit module in the half-bridge inverter circuit, C1 is a first capacitor which acts as the first DC power supply, C2 is a second capacitor which acts as the second DC power supply and Cs is the floating capacitor.

For the purpose of this description in the invention, the ratio of the peak-peak value of AC output voltage from inverter to the minimum DC input voltage is defined as voltage utilization ratio.

For the purpose of this description, diode will be used below as a non-limiting example for all the elements characterized by single directional conduction in the invention. The positive terminal of diode is referred to Anode and the negative terminal is Cathode. It will be understood that other suitable devices may be used for the elements in the invention.

For the purpose of this description, the switch MOSFET will be used as a non-limiting example for all the semiconductor switches characterized by controllable conduction in the invention. Take the N-channel MOSFET for example. The first terminal of N-channel MOSFET is referred to Drain, the second terminal is Source and the control terminal is Gate. The control terminal of each semiconductor switch in the invention is provided with its own control signal. For the sake of brevity, it is not described repeatedly below. It will be understood that other suitable devices, for example, IGBT may be used for the semiconductor switches in the invention.

For the sake of brevity, the term "bidirectional switch" as used herein is intended to refer to a semiconductor switch where the current can flow in both directions and withstand voltage in one direction, such as IGBT with a parallel diode, or MOSFET where the parallel diode is inherent.

The five-level inverter topology is used with a first DC power supply and a second DC power supply. The negative terminal of the first DC power supply is connected with the positive terminal of the second DC power supply. The five-level inverter topology comprises a half-bridge inverter circuit that outputs five mutually different voltage levels including zero; wherein the half-bridge inverter circuit comprises a floating capacitor that is charged by the first DC power supply or the second DC power supply; either the first DC power supply or the second DC power supply provides power for the half-bridge inverter circuit, or the first DC power supply or the second DC power supply alternatively added algebraically to the floating capacitor provides power for the half-bridge inverter circuit.

According to the above basic idea of the invention, embodiments will be described in detail with reference of the accompanying drawings.

FIG. 1 shows a first kind of single phase five-level inverter topology. It is connected with two capacitors (the first capacitor $C_1$ and the second capacitor $C_2$) connected in series. Each capacitor acts as a DC power supply. It comprises a first inductor $L_1$ and a half-bridge inverter circuit that outputs five mutually different voltage levels including zero. The first inductor $L_1$ is used to filter the switching frequency component and achieve a load current with almost a sinusoidal waveform.

The half-bridge inverter circuit comprises a floating capacitor $C_s$, a circuit module M1, a first switching circuit branch, a second switching circuit branch, a third switching circuit branch, a fourth switching circuit branch, a fifth switching circuit branch and a sixth switching circuit branch. Each switching circuit branch comprises a bidirectional switch. For the purpose of this description, each bidirectional switch is given the same subscript number symbol as the switching circuit branch in which it is located.

For example, the bidirectional switch in the first switching circuit branch is marked as $T_1$.

The circuit module M1 in the half-bridge inverter circuit comprises a first terminal, a second terminal, a third terminal, a fourth terminal and a fifth terminal. There is at least one circuit branch between any two of the five terminals of the circuit module M1. The first terminal of the circuit module M1 is connected between the first capacitor $C_1$ and the second capacitor $C_2$. The fourth terminal of the circuit module M1 is connected to the positive terminal of the first capacitor $C_1$ and the fifth terminal is connected to the negative terminal of the second capacitor $C_2$.

The basic function of the circuit module M1 is to charge the floating capacitor $C_s$ to the desired voltage value which is equal to or very close to the voltage level of C1 and C2 and to limit the current when the floating capacitor $C_s$ is charged. The circuit branch between the first terminal and the second terminal of the circuit module or between the first terminal and the third terminal of the circuit module forms the charging path from the first capacitor $C_1$ (i.e. the first DC power supply) or the second capacitor $C_2$ (i.e. the second DC power supply) to the floating capacitor $C_s$. The circuit module M1 comprises a current limiting device, such as an inductor, resistor, semiconductor device operated at active mode or linear mode, or the combination of the above devices. As shown in from FIG. 2 to FIG. 6, the current limiting device in the circuit module M1 is the second inductor $L_2$.

The first terminal of the first bidirectional switch $T_1$ is connected to the fourth terminal of the circuit module M1 and the second terminal is connected to the first terminal of the second bidirectional switch $T_2$ whose second terminal is connected to the fifth terminal of the circuit module M1. The first terminal of the third bidirectional switch $T_3$ is connected to both the second terminal of the circuit module M1 and the positive terminal of the floating capacitor $C_s$. The second terminal of the third bidirectional switch $T_3$ is connected to the first terminal of the fourth bidirectional switch $T_4$ whose second terminal is connected to both the third terminal of the circuit module M1 and the negative terminal of the floating capacitor $C_s$. The common terminal of the third and the fourth bidirectional switches is connected to the common terminal of the first and the second bidirectional switches. The first terminal of the fifth bidirectional switch $T_5$ is connected to the positive terminal of the floating capacitor $C_s$ and the second terminal is connected to the first terminal of the sixth bidirectional switch $T_6$ whose second terminal is connected to the negative terminal of the floating capacitor $C_s$. The common terminal of the fifth and the sixth bidirectional switches is connected to the first terminal of AC utilities or AC load through the first inductor $L_1$. The common terminal of the first capacitor $C_1$ and the second capacitor $C_2$ is connected to the second terminal of AC utilities or AC load.

Figure 2:
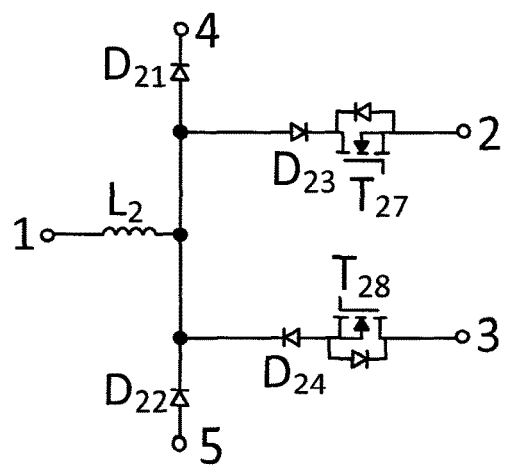
FIG. 2 is the first schematic circuit diagram of the circuit module M1 for the first kind of single phase five-level inverter topology according to an embodiment of the invention.

FIG. 2 shows a first circuit of the circuit module M1 for the first kind of single phase five-level inverter topology according to an embodiment of the invention. It comprises a second inductor $L_2$, a seventh bidirectional switch $T_{27}$, an eighth bidirectional switch $T_{28}$, a first diode $D_{21}$, a second diode $D_{22}$, a third diode $D_{23}$ and a fourth diode $D_{24}$.

The cathode of the first diode $D_{21}$ is connected to the fourth terminal of the circuit module M1 and the anode is connected to the cathode of the second diode $D_{22}$. The anode of the second diode $D_{22}$ is connected to the fifth terminal of the circuit module M1. One terminal of the second inductor $L_2$ is connected to the first terminal of the circuit module M1 and the other terminal is connected to the common terminal of the first and the second diodes. The anode of the third diode $D_{23}$ is connected to that of the first diode $D_{21}$. The cathode of the third diode $D_{23}$ is connected to the first terminal of the seventh bidirectional switch $T_{27}$ whose second terminal is connected to the second terminal of the circuit module M1. The cathode of the fourth diode $D_{24}$ is connected to that of the second diode $D_{22}$ and the anode is connected to the second terminal of the eighth bidirectional switch $T_{28}$ whose first terminal is connected to the third terminal of the circuit module M1.

The second inductor $L_2$ is used to suppress the surge current while the floating capacitor $C_s$ is being charged and to freewheel the current.

Figure 3:
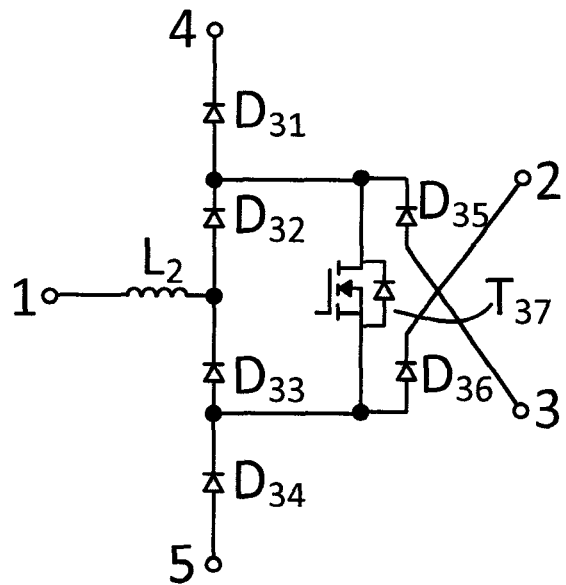
FIG. 3 is the second schematic circuit diagram of the circuit module M1 for the first kind of single phase five-level inverter topology according to an embodiment of the invention.

FIG. 3 shows a second circuit of the circuit module M1 for the first kind of single phase five-level inverter topology according to an embodiment of the invention. It comprises a second inductor $L_2$, a seventh bidirectional switch $T_{37}$, a first diode $D_{31}$, a second diode $D_{32}$, a third diode $D_{33}$, a fourth diode $D_{34}$, a fifth diode $D_{35}$ and a sixth diode $D_{36}$.

The cathode of the first diode $D_{31}$ is connected to the fourth terminal of the circuit module M1 and the anode is connected to the cathode of the second diode $D_{32}$. The anode of the second diode $D_{32}$ is connected to the cathode of the third diode $D_{33}$. The anode of the third diode $D_{33}$ is connected to the cathode of the fourth diode $D_{34}$ whose anode is connected to the fifth terminal of the circuit module M1. One terminal of the second inductor $L_2$ is connected to the first terminal of the circuit module M1 and the other terminal is connected to the common terminal of the third and the second diodes. The cathode of the fifth diode $D_{35}$ is connected to both the cathode of the second diode $D_{32}$ and the first terminal of the seventh bidirectional switch $T_{37}$. The anode of the fifth diode $D_{35}$ is connected to the third terminal of the circuit module M1. The anode of the sixth diode $D_{36}$ is connected to both that of the third diode $D_{33}$ and the second terminal of the seventh bidirectional switch $T_{37}$. The cathode of the sixth diode $D_{36}$ is connected to the second terminal of the circuit module M1.

Figure 4:
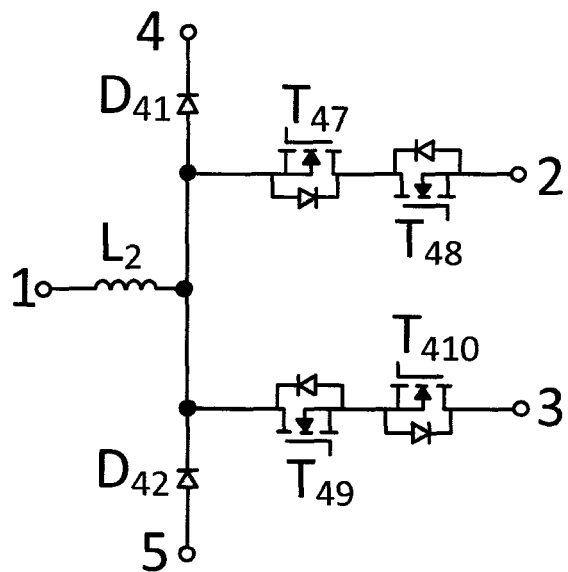
FIG. 4 is the third schematic circuit diagram of the circuit module M1 for the first kind of single phase five-level inverter topology according to an embodiment of the invention.

FIG. 4 shows a third circuit of the circuit module M1 for the first kind of single phase five-level inverter topology according to an embodiment of the invention. It comprises a second inductor $L_2$, a seventh bidirectional switch $T_{47}$, an eighth bidirectional switch $T_{48}$, ninth bidirectional switch $T_{49}$, a tenth bidirectional switch $T_{410}$, a first diode $D_{41}$ and a second diode $D_{42}$.

The cathode of the first diode $D_{41}$ is connected to the fourth terminal of the circuit module M1 and the anode is connected to the cathode of the second diode $D_{42}$. The anode of the second diode $D_{42}$ is connected to the fifth terminal of the circuit module M1. One terminal of the second inductor $L_2$ is connected to the first terminal of the circuit module M1 and the other terminal is connected to the common terminal of the first and the second diodes. The second terminal of the seventh bidirectional switch $T_{47}$ is connected to the anode of the first diode $D_{41}$. The first terminal of the seventh bidirectional switch $T_{47}$ is connected to that of the eighth bidirectional switch $T_{48}$ whose second terminal is connected to the second terminal of the circuit module M1. The first terminal of the ninth bidirectional switch $T_{49}$ is connected to the cathode of the second diode $D_{42}$ and the second terminal is connected to the second terminal of the tenth bidirectional switch $T_{410}$ whose first terminal is connected to the third terminal of the circuit module M1.

Figure 5:
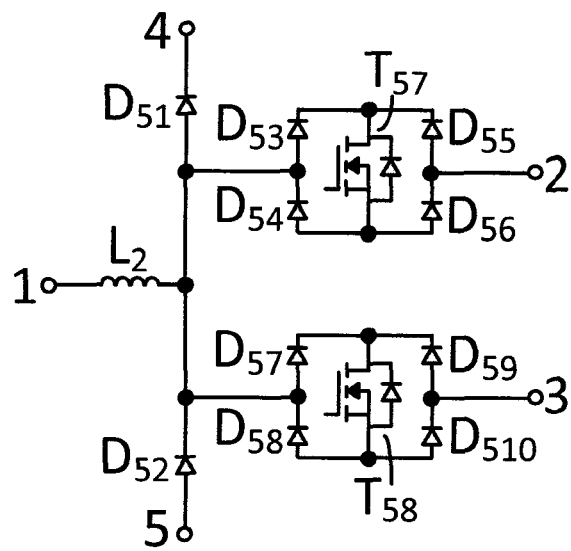
FIG. 5 is the fourth schematic circuit diagram of the circuit module M1 for the first kind of single phase five-level inverter topology according to an embodiment of the invention.

FIG. 5 shows a fourth circuit of the circuit module M1 for the first kind of single phase five-level inverter topology according to an embodiment of the invention. It comprises a second inductor $L_2$, a seventh bidirectional switch $T_{57}$, an eighth bidirectional switch $T_{58}$, a first diode $D_{51}$, a second diode $D_{52}$, a third diode $D_{53}$, a fourth diode $D_{54}$, a fifth diode $D_{55}$, a sixth diode $D_{56}$, a seventh diode $D_{57}$, an eighth diode $D_{58}$, a ninth diode $D_{59}$ and a tenth diode $D_{510}$.

The cathode of the first diode $D_{51}$ is connected to the fourth terminal of the circuit module M1 and the anode is connected to the cathode of the second diode $D_{52}$. The anode of the second diode $D_{52}$ is connected to the fifth terminal of the circuit module M1. One terminal of the second inductor $L_2$ is connected to the first terminal of the circuit module M1 and the other terminal is connected to the common terminal of the first and the second diodes.

The cathode of the third diode $D_{53}$ is connected to both that of the fifth diode $D_{55}$ and the first terminal of the seventh bidirectional switch $T_{57}$. The anode of the third diode $D_{53}$ is connected to the cathode of the fourth diode $D_{54}$ whose anode is connected to both that of the sixth diode $D_{56}$ and the second terminal of the seventh bidirectional switch $T_{57}$. The common terminal of the third and the fourth diodes is connected to the anode of the first diode $D_{51}$. The anode of the fifth diode $D_{55}$ is connected to the cathode of the sixth diode $D_{56}$. The common terminal of the fifth and the sixth diodes is connected to the second terminal of the circuit module M1.

The cathode of the seventh diode $D_{57}$ is connected to both that of the ninth diode $D_{59}$ and the first terminal of the eighth bidirectional switch $T_{58}$. The anode of the seventh diode $D_{57}$ is connected to the cathode of the eighth diode $D_{58}$ whose anode is connected to both that of the tenth diode $D_{510}$ and the second terminal of the eighth bidirectional switch $T_{58}$. The common terminal of the seventh and the eighth diodes is connected to the cathode of the second diode $D_{52}$. The anode of the ninth diode $D_{59}$ is connected to the cathode of the tenth diode $D_{510}$. The common terminal of the ninth and the tenth diodes is connected to the third terminal of the circuit module M1.

Figure 6:
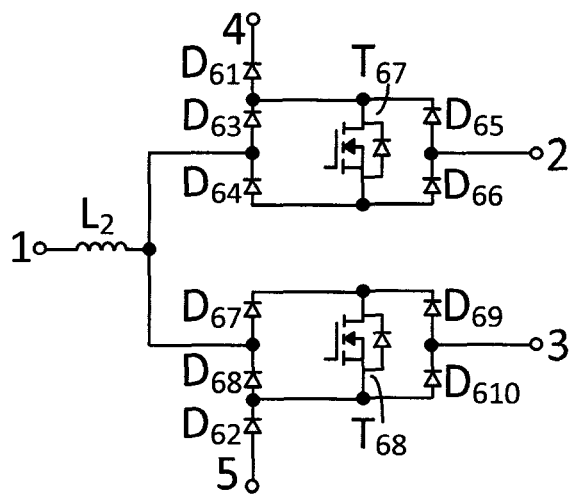
FIG. 6 is the fifth schematic circuit diagram of the circuit module M1 for the first kind of single phase five-level inverter topology according to an embodiment of the invention.

FIG. 6 shows a fifth circuit of the circuit module M1 for the first kind of single phase five-level inverter topology according to an embodiment of the invention. It comprises a second inductor $L_2$, a seventh bidirectional switch $T_{67}$, an eighth bidirectional switch $T_{68}$, a first diode $D_{61}$, a second diode $D_{62}$, a third diode $D_{63}$, a fourth diode $D_{64}$, a fifth diode $D_{65}$, a sixth diode $D_{66}$, a seventh diode $D_{67}$, an eighth diode $D_{68}$, a ninth diode $D_{69}$ and a tenth diode $D_{610}$.

The cathode of the first diode $D_{61}$ is connected to the fourth terminal of the circuit module M1 and the anode is connected to the cathode of the third diode $D_{63}$. The anode of the third diode $D_{63}$ is connected to the cathode of the fourth diode $D_{64}$. The cathode of the third diode $D_{63}$ is connected to both that of the fifth diode $D_{65}$ and the first terminal of the seventh bidirectional switch $T_{67}$. The anode of the fourth diode $D_{64}$ is connected to both that of the sixth diode $D_{66}$ and the second terminal of the seventh bidirectional switch $T_{67}$. The anode of the fifth diode $D_{65}$ is connected to the cathode of the sixth diode $D_{66}$. The common terminal of the fifth and the sixth diodes is connected to the second terminal of the circuit module M1.

The cathode of the seventh diode $D_{67}$ is connected to both that of the ninth diode $D_{69}$ and the first terminal of the eighth bidirectional switch $T_{68}$. The anode of the seventh diode $D_{67}$ is connected to the cathode of the eighth diode $D_{68}$. The anode of the eighth diode $D_{68}$ is connected to both that of the tenth diode $D_{610}$ and the second terminal of the eighth bidirectional switch $T_{68}$. The anode of the ninth diode $D_{69}$ is connected to the cathode of the tenth diode $D_{610}$. The common terminal of the ninth and the tenth diodes is connected to the third terminal of the circuit module M1.

The anode of the eighth diode $D_{68}$ is connected to the cathode of the second diode $D_{62}$ whose anode is connected to the fifth terminal of the circuit module M1.

One terminal of the second inductor $L_2$ is connected to the first terminal of the circuit module M1 and the other terminal is connected to both the common terminal of the third and the fourth diodes and the common terminal of the seventh and the eighth diodes.

Figure 7:
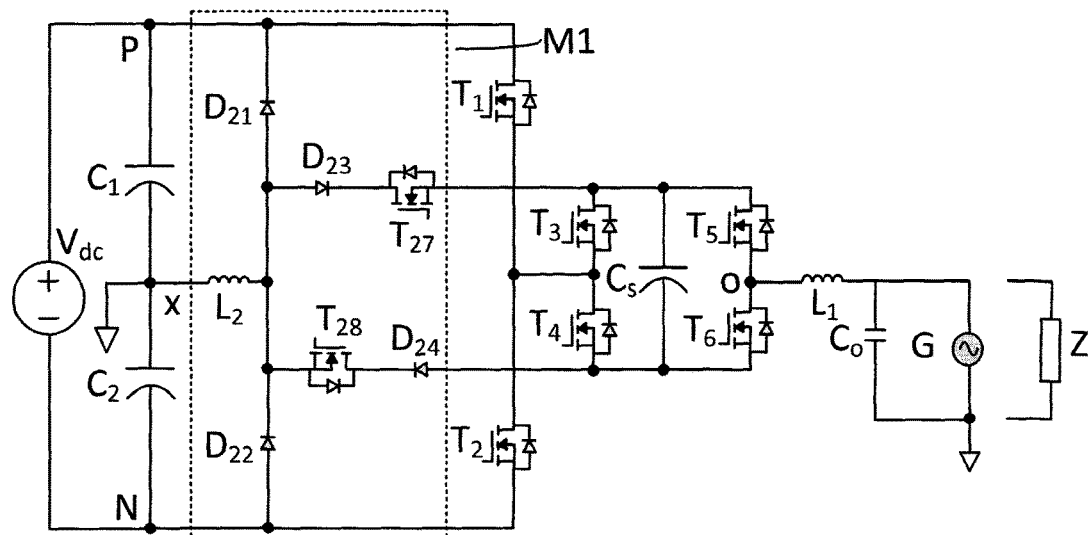
FIG. 7 is the circuit diagram of the first kind of single phase five-level inverter with the circuit module M1 shown in FIG. 2 according to an embodiment of the invention.

As shown in FIG. 7, take the single phase five-level inverter combined with the circuit module M1 shown in FIG. 2 for example to illustrate how it works. Six operational modes are provided.

Suppose the total voltage of DC power supply is $V_{dc}$. Both the said first capacitor $C_1$ voltage and the second capacitor $C_2$ voltage are half of $V_{dc}$ as their capacities are equal according to the embodiment. Since the said floating capacitor $C_s$ is charged by either the first capacitor $C_1$ or the second capacitor $C_2$, its voltage is also half of Vdc. The current in the first inductor L1 flowing from left to right in the accompanied drawings is defined as positive current and the opposite as negative current.

Figure 8:
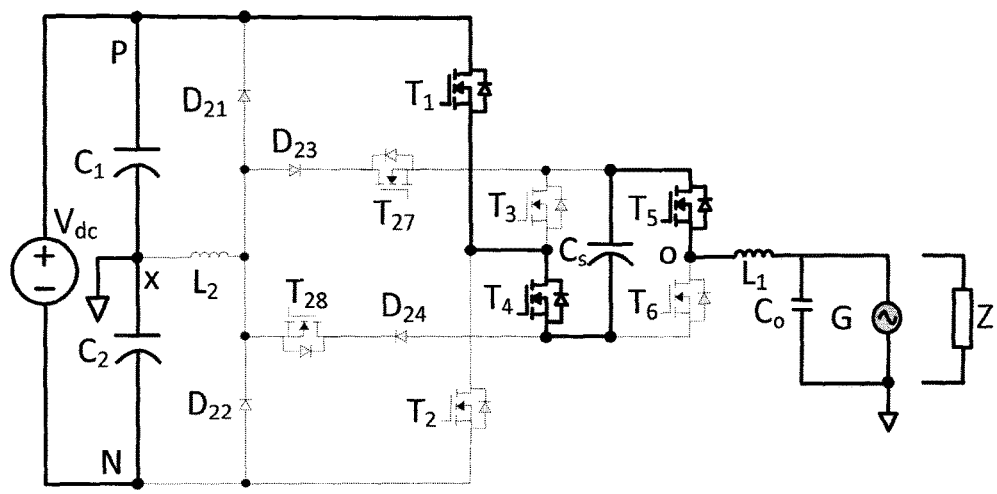
FIG. 8 is the first operational mode diagram of the single phase five-level inverter in FIG. 7 according to an embodiment of the invention.

For the first operational mode of the single phase five-level inverter shown in FIG. 8, the positive current flows as follows: C1→T1→T4→Cs→T5→L1→G→C1, and the negative current flows: C1→G→L1→T5→Cs→T4→T1→C1. The output voltage UOX from the inverter equals the sum of the said floating capacitor Cs voltage and the said first capacitor C1 voltage. That is, UOX=Vdc/2+Vdc/2=Vdc.

Figure 9:
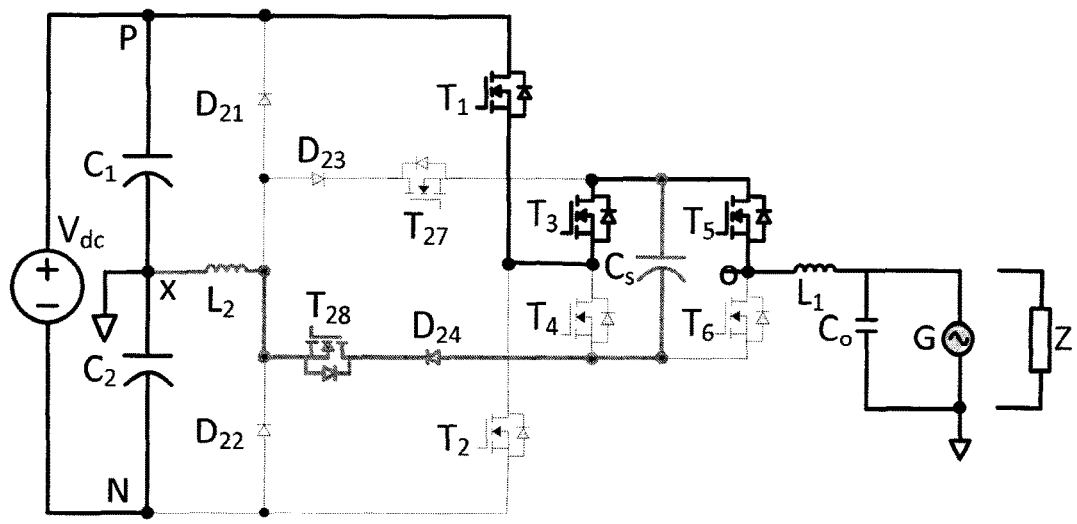
FIG. 9 is the second operational mode diagram of the single phase five-level inverter in FIG. 7 according to an embodiment of the invention.

For the second operational mode of the single phase five-level inverter shown in FIG. 9, the positive current flows as follows: C1→T1→T3→T5→L1→G→C1, and the negative current flows: C1→G→L1→T5→T3→T1→C1. The output voltage UOX from the inverter equals the said first capacitor C1 voltage. That is, UOX=Vdc/2.

The floating capacitor Cs is charged by the first capacitor C1 in the second operational mode. The charging loop circuit is as follows: C1→T1→T3→Cs→D24→T28→L2→C1.

Figure 10:
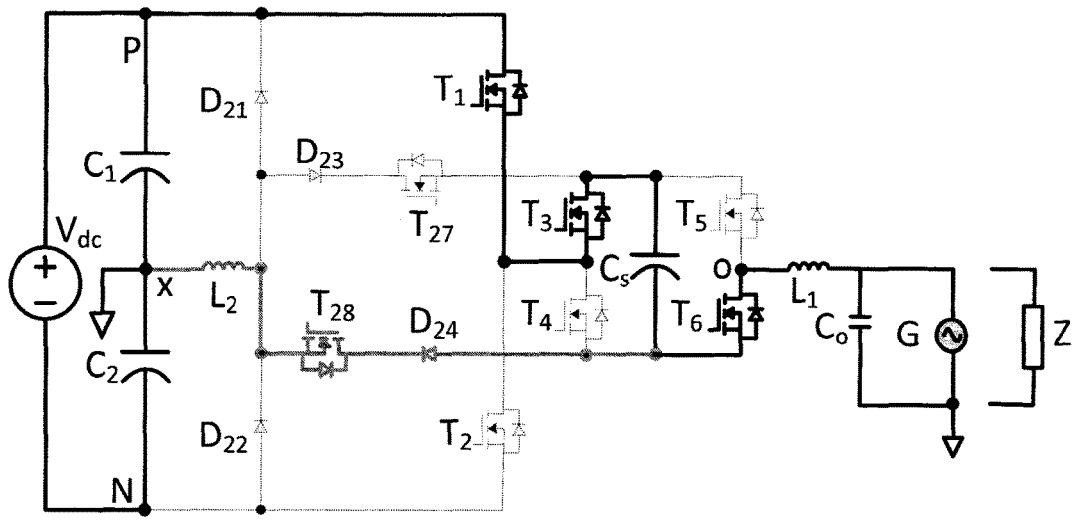
FIG. 10 is the third operational mode diagram of the single phase five-level inverter in FIG. 7 according to an embodiment of the invention.

For the third operational mode of the single phase five-level inverter shown in FIG. 10, the positive current flows as follows: C1→T1→T3→Cs→T6→L1→G→C1, and the negative current flows: C1→G→L1→T6→Cs→T3→T1→C1. The output voltage UOX from the inverter equals the said first capacitor C1 voltage plus the minus floating capacitor Cs voltage. That is, UOX=Vdc/2+(-Vdc/2)=0. There is a charging loop circuit for the floating capacitor Cs. It is same as that in the second operational mode.

Figure 11:
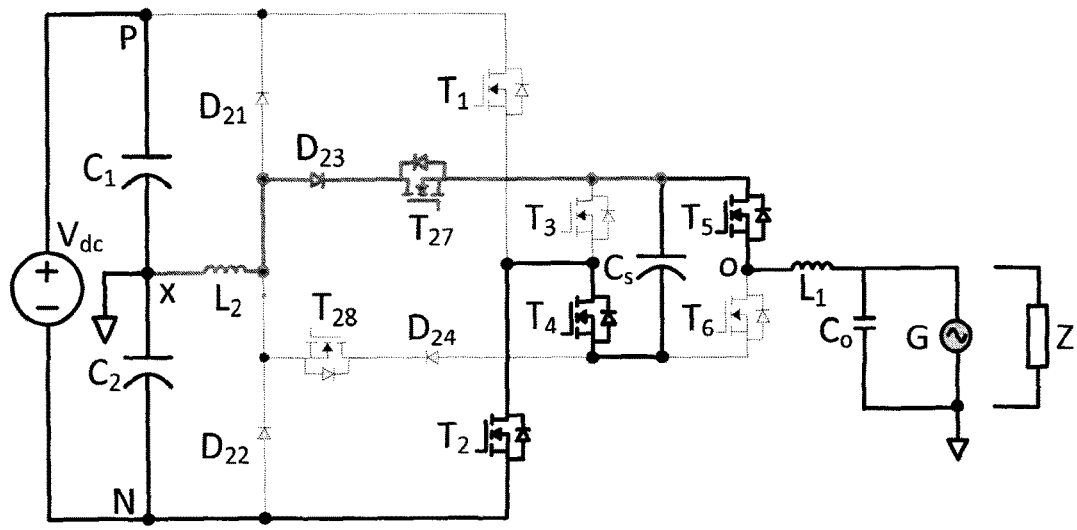
FIG. 11 is the fourth operational mode diagram of the single phase five-level inverter in FIG. 7 according to an embodiment of the invention.

For the fourth operational mode of the single phase five-level inverter shown in FIG. 11, the positive current flows as follows: L2→D23→T27→T5→L1→G→L2. There is a charging loop circuit for the floating capacitor Cs. It is as follows: L2→D23→T27→Cs→T4→T2→C2→L2. The output voltage UOX from the inverter equals the floating capacitor Cs voltage plus the minus second capacitor C2 voltage. That is, UOX=Vdc/2+(-Vdc/2)=0.

Figure 12:
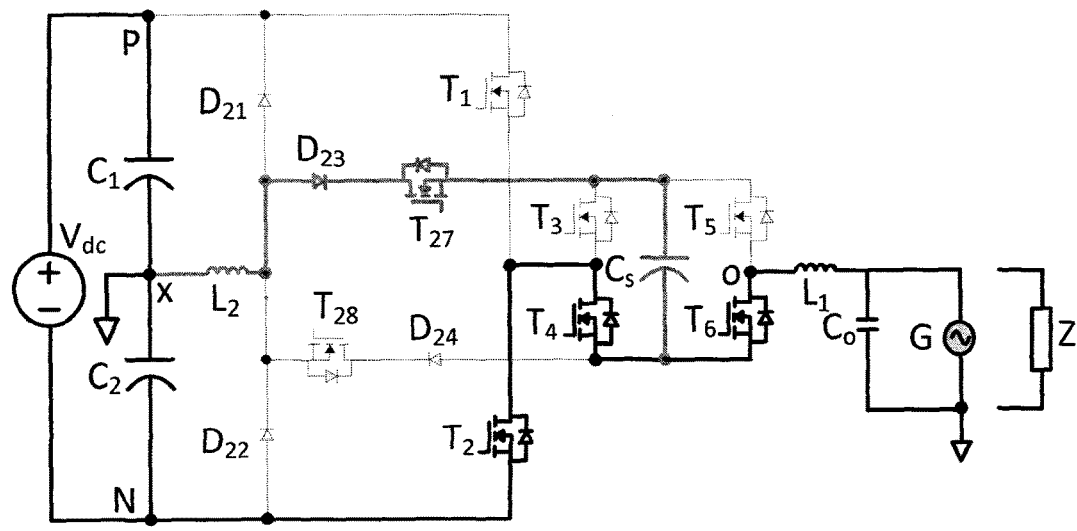
FIG. 12 is the fifth operational mode diagram of the single phase five-level inverter in FIG. 7 according to an embodiment of the invention.

For the fifth operational mode of the single phase five-level inverter shown in FIG. 12, the positive current flows as follows: L2→D23→T27→Cs→T6→L1→G→L2. The floating capacitor Cs is charged by the second capacitor C2 through the following loop circuit: L2→D23→T27→Cs→T4→T2→C2→L2. The output voltage UOX from the inverter equals the minus second capacitor C2 voltage. That is, UOX=-Vdc/2.

Figure 13:
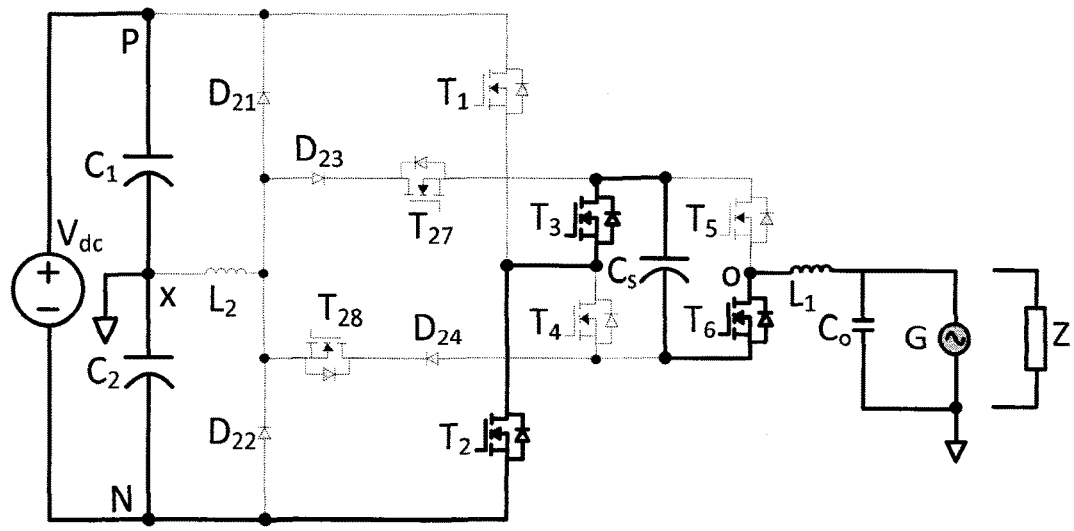
FIG. 13 is the sixth operational mode diagram of the single phase five-level inverter in FIG. 7 according to an embodiment of the invention.

For the sixth operational mode of the single phase five-level inverter shown in FIG. 13, the positive current flows as follows: C2→T2→T3→Cs→T6→L1→G→C2, and the negative current flows: C2→G→L1→T6→Cs→T3→T2→C2. The output voltage UOX from the inverter equals the minus floating capacitor Cs voltage plus the minus second capacitor C2 voltage. That is, UOX=(-Vdc/2)+(-Vdc/2)=-Vdc.

The single phase five-level inverter in FIG. 7 works alternately among the six above-mentioned operational modes by controlling either of the on and off states of each switch to output the expected voltage. For the sake of brevity, the terms "A", "B", "C", "D", "E" and "F" as used herein are intended to respectively refer to the first, the second, the third, the fourth, the fifth and the sixth operational modes of the single phase five-level inverter.

For the first operational mode, the output voltage UOX from the single phase five-level inverter equals the sum of the first capacitor C1 voltage and the floating capacitor Cs voltage; for the sixth operational mode, the output voltage UOX equals the sum of the minus floating capacitor Cs voltage and the minus second capacitor C2 voltage. So under the same operating conditions, the voltage utilization ratio of the single phase five-level inverter is twice that of the present single phase five-level half-bridge inverter where the floating capacitor is absent. As the single phase five-level inverter outputs five mutually different voltage levels including zero, the ripple voltage is smaller than that of the single phase three-level inverter. Therefore, the inductance of the first inductor L1 is smaller than that of the single phase three-level inverter.

Figure 14:
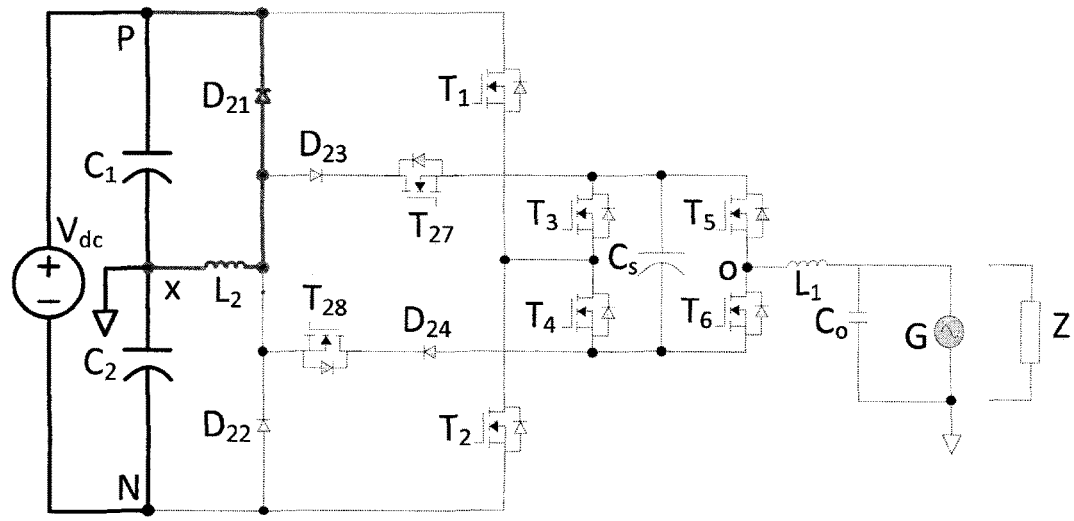
FIG. 14 is the first free-wheeling operational mode diagram of the single phase five-level inverter in FIG. 7 according to an embodiment of the invention.
Figure 15:
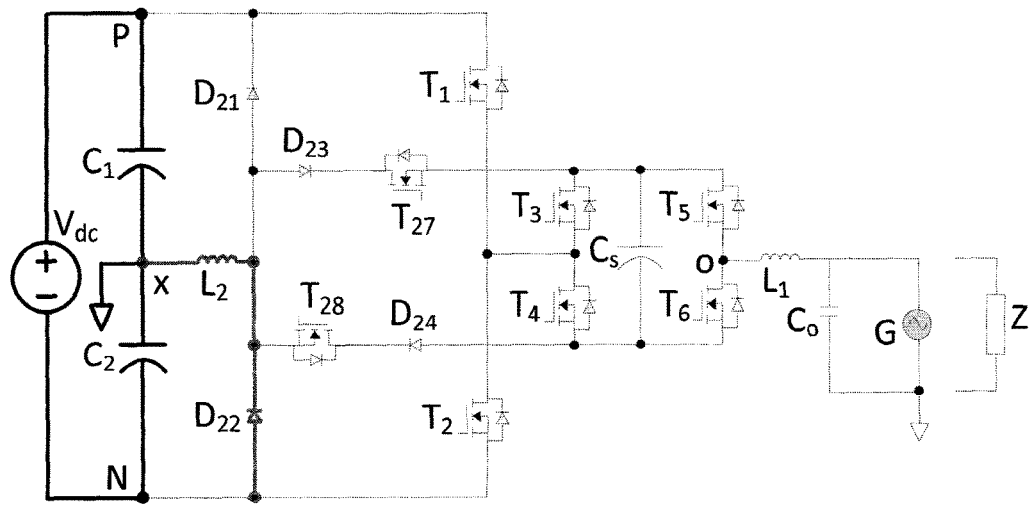
FIG. 15 is the second free-wheeling operational mode diagram of the single phase five-level inverter in FIG. 7 according to an embodiment of the invention.

There is a free-wheeling loop circuit for the second inductor L2 when both of the directional switches T27 and T28 are turned off. When the current in the second inductor L2 flows from left to right in the accompanied drawings, the free-wheeling loop circuit is as follows: L2→D21→C1→L2, as shown in FIG. 14; otherwise, it is: L2→C2→D22→L2, as shown in FIG. 15.

Figure 16:
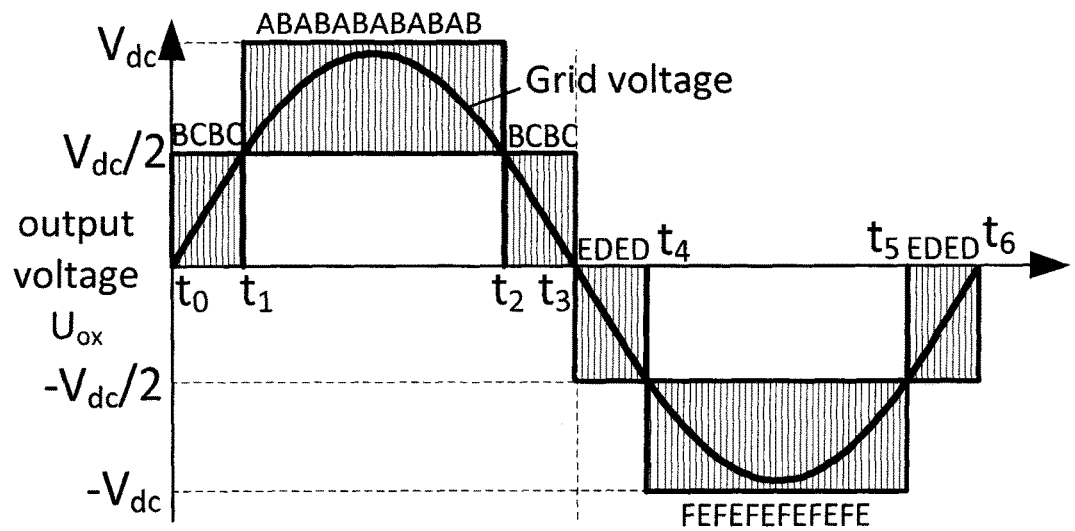
FIG. 16 is the modulation mode diagram of the single phase five-level inverter in FIG. 7 according to an embodiment of the invention.

FIG. 16 is one modulation mode diagram of the single phase five-level inverter shown in FIG. 7 according to an embodiment of the invention.

As shown in FIG. 16, it is in positive half cycle of AC grid voltage during the time period of t1-t2. The AC grid voltage is more than half of Vdc but less than Vdc. The inverter works alternately in the first operational mode A and the second B.

It is in negative half cycle of AC grid voltage during the time period of t4-t5. The AC grid voltage is between half of minus Vdc and minus Vdc. The inverter works alternately in the fifth operational mode E and the sixth F.

It is in positive half cycle of AC grid voltage during the time periods of t0-t1 and t2-t3. The AC grid voltage is less than half of Vdc but more than zero. The inverter works alternately among the second operational mode B and the third C.

It is in negative half cycle of AC grid voltage during the time periods of t3-t4 and t5-t6. The AC grid voltage is between zero and half of minus Vdc. The inverter works alternately among the fifth operational mode E and the fourth D. It is noted that the floating capacitor Cs is charged by the first capacitor C1 during the time periods of t0-t1 and t2-t3 in the positive half cycle of AC grid voltage and that it is charged by the second capacitor C2 during the time periods of t3-t4 and t5-t6 in the negative half cycle of AC grid voltage. As the AC grid voltage is symmetrical in the positive and the negative half cycle, the charges transferred from the first capacitor C1 to the floating capacitor Cs during positive half cycle of the output voltage and the charges transferred from the second capacitor C2 to the floating capacitor Cs during the negative half cycle of the output voltage are same. So the mid-point voltage between the first capacitor C1 and the second C2 is balanced automatically.

Figure 17:
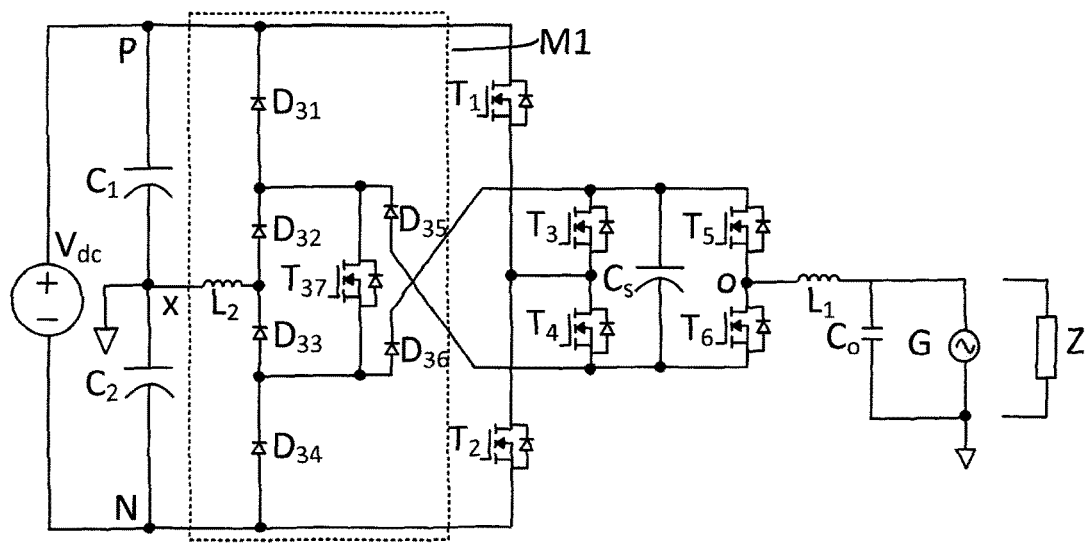
FIG. 17 is the circuit diagram of the first kind of single phase five-level inverter with the circuit module M1 shown in FIG. 3 according to an embodiment of the invention.

FIG. 17 shows another circuit of the first kind of single phase five-level inverter topology. It comprises the circuit module M1 in FIG. 3. Its operational principles and modulation modes are similar to those of the single phase five-level inverter topology in FIG. 7. For the sake of brevity, they are not described here.

Figure 18:
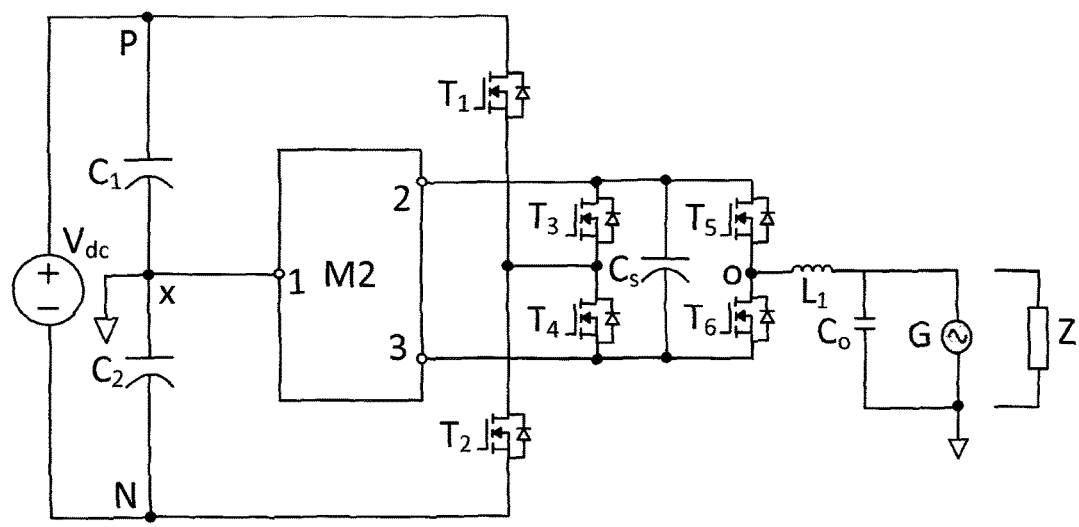
FIG. 18 is a circuit diagram in partial block form of a second kind of single phase five-level inverter topology according to an embodiment of the invention.

FIG. 18 shows a second kind of single phase five-level inverter topology. It is connected with two capacitors (the first capacitor $C_1$ and the second capacitor $C_2$) connected in series. Each capacitor acts as a DC power supply. It comprises a first inductor $L_1$ and a half-bridge inverter circuit that outputs five mutually different voltage levels including zero. The first inductor $L_1$ is used to filter the switching frequency component and achieve a load current with almost a sinusoidal waveform.

The half-bridge inverter circuit provided in the invention comprises a floating capacitor $C_s$, a circuit module M2, a first switching circuit branch, a second switching circuit branch, a third switching circuit branch, a fourth switching circuit branch, a fifth switching circuit branch and a sixth switching circuit branch. Each switching circuit branch comprises a bidirectional switch. For the purpose of this description, each bidirectional switch is given the same subscript number symbol as the switching circuit branch in which it is located. For example, the bidirectional switch in the first switching circuit branch is marked as $T_1$.

The circuit module M2 in the half-bridge inverter circuit comprises a first terminal, a second terminal and a third terminal. There is at least one circuit branch between any two terminals. The first terminal of the circuit module M2 is connected between the first capacitor $C_1$ and the second capacitor $C_2$.

The basic function of the circuit module M2 is to charge the floating capacitor $C_s$ to the desired voltage level which is equal to the voltage level of C1 and C2 and to limit the current when the floating capacitor $C_s$ is charged. The circuit branch between the first terminal and the second terminal of the circuit module or between the first terminal and the third terminal of the circuit module forms the charging path from the first capacitor $C_1$ (i.e. the first DC power supply) or the second capacitor $C_2$ (i.e. the second DC power supply) to the floating capacitor $C_s$. The circuit module M2 comprises a current limiting device, such as an inductor, resistor, semiconductor device operated at active mode or linear mode, or the combination of the above devices. As shown in from FIG. 19 to FIG. 22, the current limiting device in the circuit module M2 is the second inductor $L_2$.

The first terminal of the first bidirectional switch $T_1$ is connected to the positive terminal of the first capacitor $C_1$ and the second terminal is connected to the first terminal of the second bidirectional switch $T_2$ whose second terminal is connected to the negative terminal of the second capacitor $C_2$. The first terminal of the third bidirectional switch $T_3$ is connected to both the second terminal of the circuit module M2 and the positive terminal of the floating capacitor $C_s$. The second terminal of the third bidirectional switch $T_3$ is connected to the first terminal of the fourth bidirectional switch $T_4$ whose second terminal is connected to both the third terminal of the circuit module M2 and the negative terminal of the floating capacitor $C_s$. The common terminal of the third and the fourth bidirectional switches is connected to the common terminal of the first and the second bidirectional switches. The first terminal of the fifth bidirectional switch $T_5$ is connected to the positive terminal of the floating capacitor $C_s$ and the second terminal is connected to the first terminal of the sixth bidirectional switch $T_6$ whose second terminal is connected to the negative terminal of the floating capacitor $C_s$. The common terminal of the fifth and the sixth bidirectional switches is connected to one terminal of AC utilities or AC load through the first inductor $L_1$.

In addition, the common terminal of the first capacitor $C_1$ and the second capacitor $C_2$ is connected to the other terminal of AC utilities or AC load.

Figure 19:
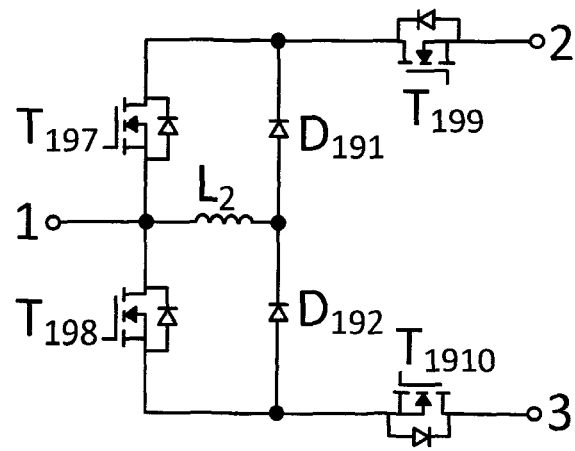
FIG. 19 is the first schematic circuit diagram of the circuit module M2 for the second kind of single phase five-level inverter topology according to an embodiment of the invention.

FIG. 19 shows a first circuit of the circuit module M2 for the second kind of single phase five-level inverter. It comprises a second inductor $L_2$, a seventh bidirectional switch $T_{197}$, an eighth bidirectional switch $T_{198}$, a ninth bidirectional switch $T_{199}$, a tenth bidirectional switch $T_{1910}$, a first diode $D_{191}$ and a second diode $D_{192}$.

The first terminal of the seventh bidirectional switch $T_{197}$ is connected to both that of the ninth bidirectional switch $T_{199}$ and the cathode of the first diode $D_{191}$. The second terminal of the ninth bidirectional switch $T_{199}$ is connected to the second terminal of the circuit module M2. The second terminal of the seventh bidirectional switch $T_{197}$ is connected to the first terminal of the eighth bidirectional switch $T_{198}$ whose second terminal is connected to both the anode of the second diode $D_{192}$ and the second terminal of the tenth bidirectional switch $T_{1910}$. The first terminal of the tenth bidirectional switch $T_{1910}$ is connected to the third terminal of the circuit module M2. The anode of the first diode $D_{191}$ is connected to the cathode of the second diode $D_{192}$.

One terminal of the second inductor $L_2$ is connected to both the common terminal of the seventh and the eighth bidirectional switches and the first terminal of the circuit module M2, and the other terminal is connected to the common terminal of the first and the second diodes.

Figure 20:
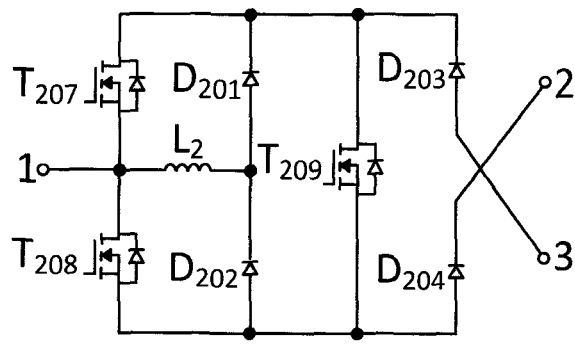
FIG. 20 is the second schematic circuit diagram of the circuit module M2 for the second kind of single phase five-level inverter topology according to an embodiment of the invention.

FIG. 20 shows a second circuit of the circuit module M2 for the second kind of single phase five-level inverter. It comprises a second inductor $L_2$, a seventh bidirectional switch $T_{207}$, an eighth bidirectional switch $T_{208}$, a ninth bidirectional switch $T_{209}$, a first diode $D_{201}$, a second diode $D_{202}$, a third diode $D_{203}$ and a fourth diode $D_{204}$.

The first terminal of the seventh bidirectional switch $T_{207}$ is connected to both that of the ninth bidirectional switch $T_{209}$ and the cathode of the first diode $D_{201}$. The second terminal of the seventh bidirectional switch $T_{207}$ is connected to the first terminal of the eighth bidirectional switch $T_{208}$ whose second terminal is connected to both the anode of the second diode $D_{202}$ and the second terminal of the ninth bidirectional switch $T_{209}$. The anode of the first diode $D_{201}$ is connected to the cathode of the second diode $D_{202}$. The cathode of the third diode $D_{203}$ is connected to the first terminal of the ninth bidirectional switch $T_{209}$ and the anode is connected to the third terminal of the circuit module M2. The anode of the fourth diode $D_{204}$ is connected to the second terminal of the ninth bidirectional switch $T_{209}$ and the cathode is connected to the second terminal of the circuit module M2.

One terminal of the second inductor $L_2$ is connected to both the common terminal of the seventh and the eighth bidirectional switches and the first terminal of the circuit module M2, and the other terminal of the second inductor $L_2$ is connected to the common terminal of the first and the second diodes.

Figure 21:
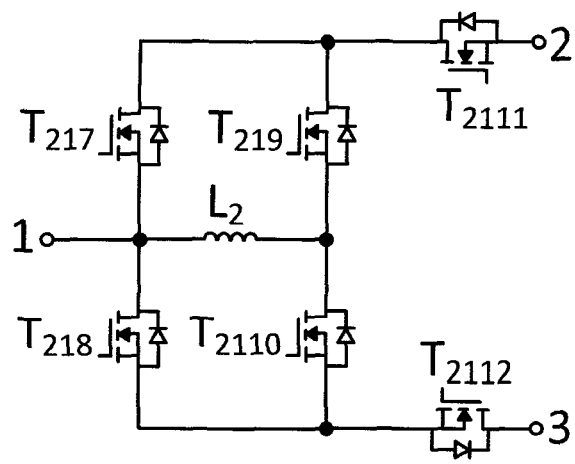
FIG. 21 is the third schematic circuit diagram of the circuit module M2 for the second kind of single phase five-level inverter topology according to an embodiment of the invention.

FIG. 21 shows a third circuit of the circuit module M2 for the second kind of single phase five-level inverter. It comprises a second inductor $L_2$, a seventh bidirectional switch $T_{217}$, an eighth bidirectional switch $T_{218}$, a ninth bidirectional switch $T_{219}$, a tenth bidirectional switch $T_{2110}$, an eleventh bidirectional switch $T_{2211}$ and a twelfth bidirectional switch $T_{2112}$.

The first terminal of the seventh bidirectional switch $T_{217}$ is connected to both that of the ninth bidirectional switch $T_{219}$ and that of the eleventh bidirectional switch $T_{2111}$. The second terminal of the seventh bidirectional switch $T_{217}$ is connected to the first terminal of the eighth bidirectional switch $T_{218}$ whose second terminal is connected to both the second terminal of the tenth bidirectional switch $T_{2210}$ and the second terminal of the twelfth bidirectional switch $T_{2112}$. The second terminal of the ninth bidirectional switch $T_{219}$ is connected to the first terminal of the tenth bidirectional switch $T_{2110}$. The second terminal of the eleventh bidirectional switch $T_{2111}$ is connected to the second terminal of the circuit module M2. The first terminal of the twelfth bidirectional switch $T_{2112}$ is connected to the third terminal of the circuit module M2.

One terminal of the second inductor $L_2$ is connected to both the common terminal of the seventh and the eighth bidirectional switches and the first terminal of the circuit module M2, and the other terminal of the second inductor $L_2$ is connected to the common terminal of the ninth and the tenth bidirectional switches.

Figure 22:
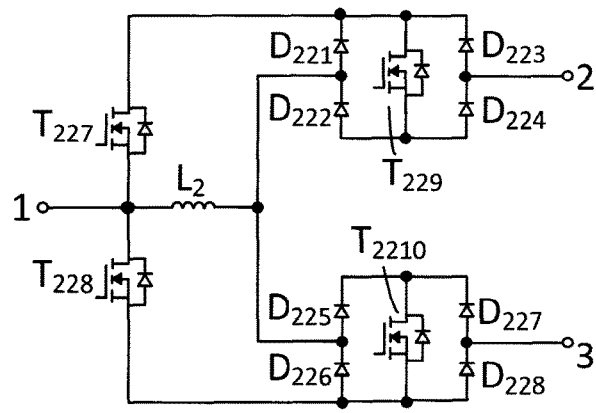
FIG. 22 is the fourth schematic circuit diagram of the circuit module M2 for the second kind of single phase five-level inverter topology according to an embodiment of the invention.

FIG. 22 shows a fourth circuit of the circuit module M2 for the second kind of single phase five-level inverter. It comprises a second inductor $L_2$, a seventh bidirectional switch $T_{227}$, an eighth bidirectional switch $T_{228}$, a ninth bidirectional switch $T_{229}$, an tenth bidirectional switch $T_{2210}$, a first diode $D_{221}$, a second diode $D_{222}$, a third diode $D_{223}$, a fourth diode $D_{224}$, a fifth diode $D_{225}$, a sixth diode $D_{226}$, a seventh diode $D_{227}$ and an eighth diode $D_{228}$.

The first terminal of the seventh bidirectional switch $T_{227}$ is connected to both that of the ninth bidirectional switch $T_{229}$ and the cathode of the first diode $D_{221}$. The second terminal of the seventh bidirectional switch $T_{227}$ is connected to the first terminal of the eighth bidirectional switch $T_{228}$ whose second terminal is connected to both the second terminal of the tenth bidirectional switch $T_{2210}$ and the anode of the sixth diode $D_{226}$.

The anode of the first diode $D_{221}$ is connected to the cathode of the second diode $D_{222}$. The anode of the second diode $D_{222}$ is connected to both the anode of the fourth diode $D_{224}$ and the second terminal of the ninth bidirectional switch $T_{229}$. The cathode of the third diode $D_{223}$ is connected to the first terminal of the ninth bidirectional switch $T_{229}$ and the anode of the third diode $D_{223}$ is connected to both the cathode of the fourth diode $D_{224}$ and the second terminal of the circuit module M2.

The cathode of the fifth diode $D_{225}$ is connected to both the first terminal of the tenth bidirectional switch $T_{2210}$ and the cathode of the seventh diode $D_{227}$. The anode of the fifth diode $D_{225}$ is connected to the cathode of the sixth diode $D_{226}$. The anode of the seventh diode $D_{227}$ is connected to both the cathode of the eighth diode $D_{228}$ and the third terminal of the circuit module M2. The anode of the eighth diode $D_{228}$ is connected to the second terminal of the tenth bidirectional switch $T_{2210}$.

One terminal of the second inductor $L_2$ is connected to both the first terminal of the circuit module M2 and the common terminal of the seventh and the eighth bidirectional switches, and the other terminal of the second inductor $L_2$ of the second inductor $L_2$ is connected to both the common terminal of the first and the second diodes and the common terminal of the sixth and the fifth diodes.

The operational principles of the second kind of single phase five-level inverter as shown in FIG. 18 are similar to those of the first kind of single phase five-level inverter as shown in FIG. 1. Similar analysis about operational modes and modulation modes is easily made for the second kind with reference of that of the first kind. For the sake of brevity, it is not described here. However, the free-wheeling loop circuit for the second inductor $L_2$ in the second kind is different from that in the first kind.

Figure 23:
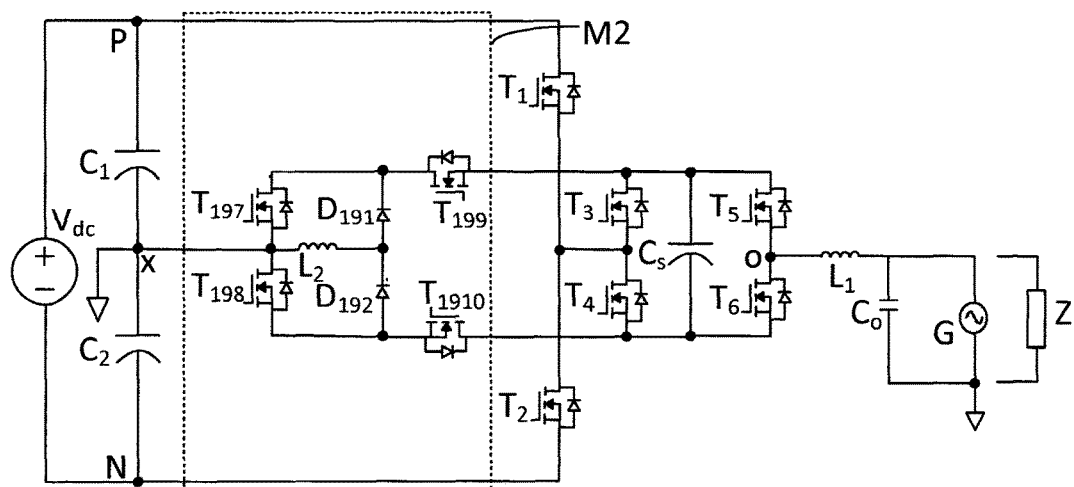
FIG. 23 is the circuit diagram of the second kind of single phase five-level inverter with the circuit module M2 shown in FIG. 19 according to an embodiment of the invention.

FIG. 23 shows the circuit of the single phase five-level inverter combined with the circuit module M2 shown in FIG. 19. Take the inverter in FIG. 23 as an example to illustrate the free-wheeling loop circuit for the second inductor L2.

When the current in the second inductor L2 in FIG. 23 flows from left to right, the free-wheeling loop circuit is as follows: L2→D191→T197→L2; otherwise, it is: L2→T198→D192→L2.

There is only one AC filtering inductor L1 in need in either the first kind or the second kind of single phase five-level inverter topology. It lowers the system cost and reduces the size. At the same time, high efficiency is achieved for the absence of the additional boosting circuit at the input side and also for the five-level inverter topology. Furthermore, the leakage current is eliminated substantially by using the half-bridge inverter circuit. The voltage utilization ratio of the single phase five-level inverter in the invention is same as that of the single phase full bridge inverter (such as H5, Heric, H6) under the same operating conditions.

Figure 24A:
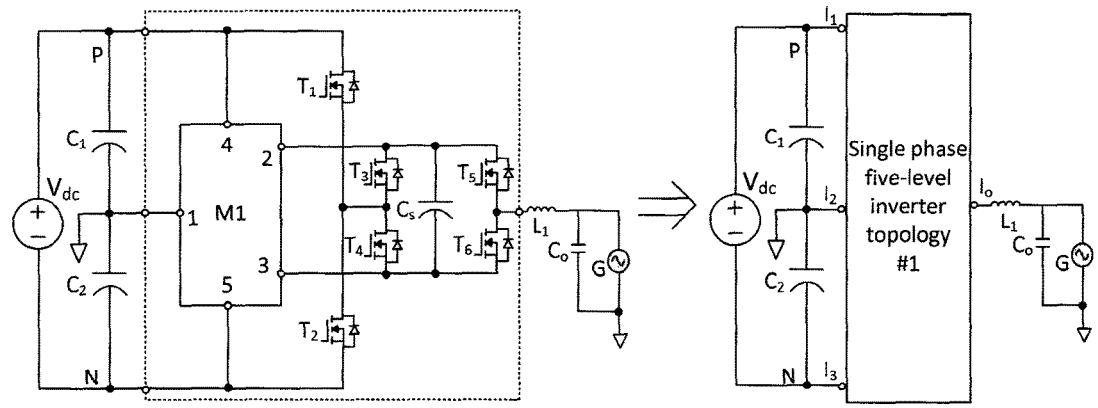
FIG. 24 (a) is an equivalent block circuit diagram of the first kind of single phase five-level inverter topology according to an embodiment of the invention.

FIG. 24(a) shows an equivalent block circuit diagram of the first kind of single phase five-level inverter topology. As shown in FIG. 24(a), the fourth terminal of the circuit module M1 is defined as the first DC input terminal I1 of the first kind of single phase five-level inverter topology, the first terminal of the circuit module M1 is defined as the second DC input terminal I2, and the fifth terminal of the circuit module M1 is defined as the third DC input terminal I3.

Figure 24B:
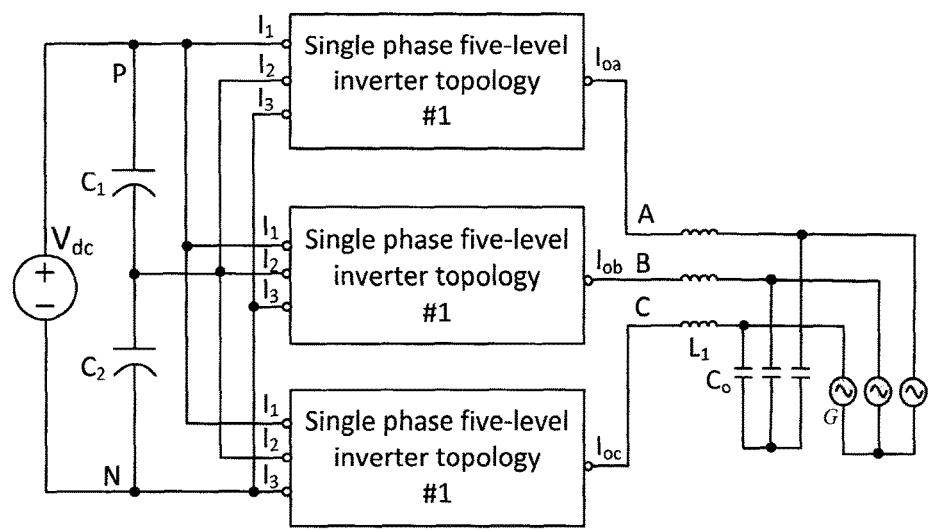

FIG. 24(b) is the circuit diagram in partial block form of a first kind of three-phase five-level inverter topology based on the equivalent circuit in FIG. 24(a). As shown in FIG. 24(b), it comprises three of the first kind of single phase five-level inverter topologies. The three single phase five-level inverter topologies are connected in parallel at their input sides. That is to say, all the first DC input terminals are connected to the positive terminal of the first capacitor C1; all the second DC input terminals are connected to the common terminal of the first capacitor C1 and the second capacitor C2; and all the third DC input terminals are connected to the negative terminal of the second capacitor C2. The AC output terminals of the three single phase five-level inverter topologies are respectively connected to three phases of AC utilities or AC load.

Each circuit module M1 of the three single phase five-level inverter topologies in FIG. 24(b) can employ any one shown in FIG. 2 to FIG. 6. The three circuit modules with the same circuits are preferred as it is more flexible from manufacturing point of view. For example, they all use the circuit module M1 shown in FIG. 3.

Figure 25A:
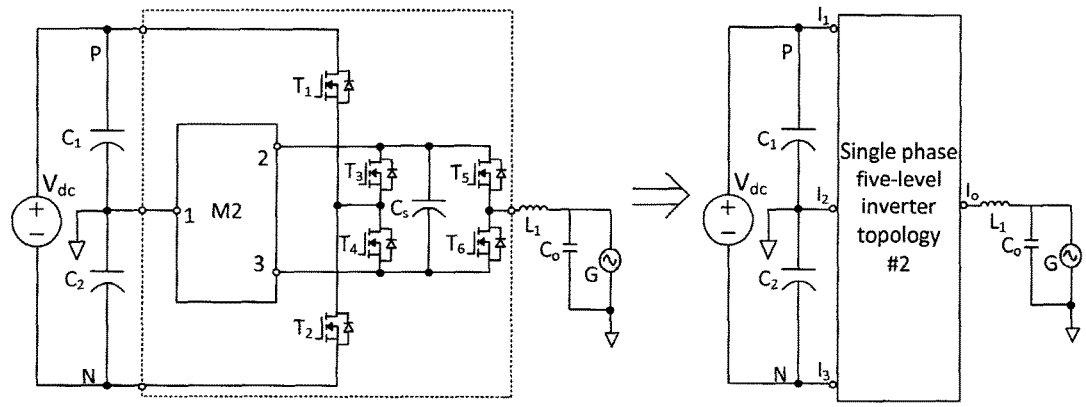
FIG. 25 (a) is an equivalent block circuit diagram of the second kind of single phase five-level inverter topology according to an embodiment of the invention.

FIG. 25(a) shows an equivalent block circuit diagram of the second kind of single phase five-level inverter topology. As shown in FIG. 25(a), the first terminal of the first switching circuit branch (T1) is defined as the first DC input terminal I1 of the second kind of single phase five-level inverter topology, the first terminal of the circuit module M2 is defined as the second DC input terminal I2, and the second terminal of the second switching circuit branch (T2) is defined as the third DC input terminal I3.

Figure 25B:
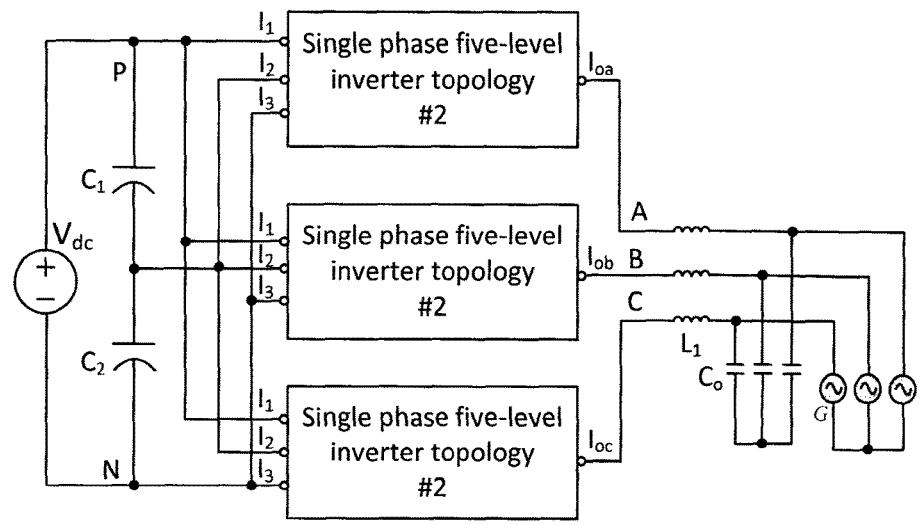

FIG. 25(b) is the circuit diagram in partial block form of a second kind of three-phase five-level inverter topology based on the equivalent circuit in FIG. 25(a). As shown in FIG. 25(b), it comprises three of the second kind of single phase five-level inverter topologies. The three single phase five-level inverter topologies are connected in parallel at their input sides. That is to say, all the first DC input terminals are connected to the positive terminal of the first capacitor C1; all the second DC input terminals are connected to the common terminal of the first capacitor C1 and the second capacitor C2; and all the third DC input terminals are connected to the negative terminal of the second capacitor C2. The AC output terminals of the three single phase five-level inverter topologies are respectively connected to three phases of AC utilities or AC load.

Each circuit module M2 of the three single phase five-level inverter topologies in FIG. 25(b) can employ any one shown in from FIG. 19 to FIG. 22. The three circuit modules with the same circuits are preferred as it is more flexible from manufacturing point of view. For example, they all use the circuit module M2 shown in FIG. 19.

Figure 26A:
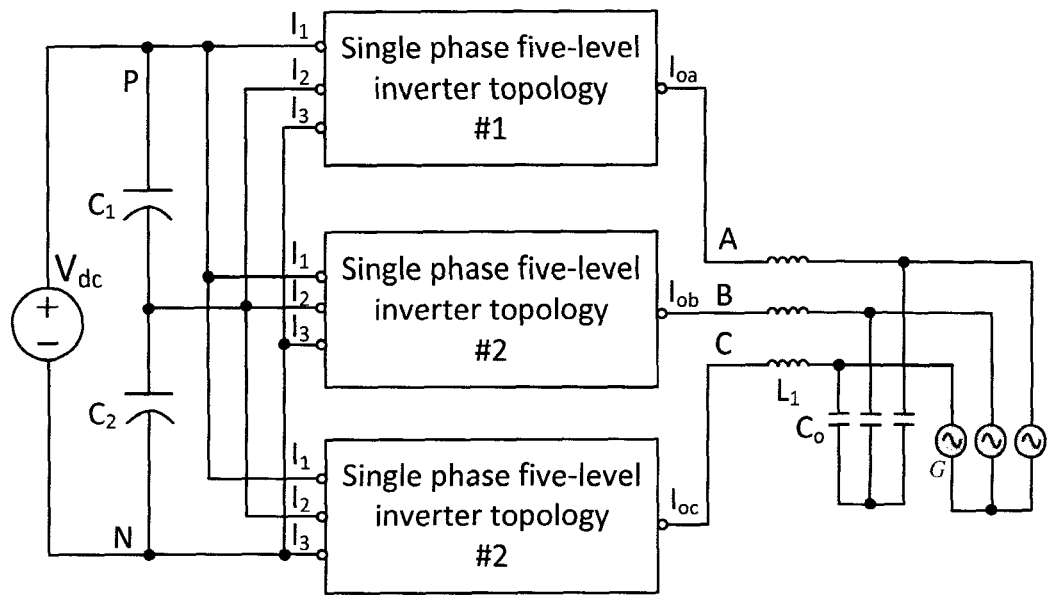
FIG. 26 (a) is the circuit diagram in partial block form of a first three-phase five-level inverter topology based on the equivalent circuit in FIG. 24(a) and FIG. 25(a) according to an embodiment of the invention.

FIG. 26(a) is the circuit diagram in partial block form of a third kind of three-phase five-level inverter topology based on the equivalent circuit in FIG. 24(a) and FIG. 25(a). As shown in FIG. 26(a), it comprises one of the first kind of single phase five-level inverter topology and two of the second kind of single phase five-level inverter topologies. The three single phase five-level inverter topologies are connected in parallel at their input sides. That is to say, all the first DC input terminals are connected to the positive terminal of the first capacitor C1; all the second DC input terminals are connected to the common terminal of the first capacitor C1 and the second capacitor C2; and all the third DC input terminals are connected to the negative terminal of the second capacitor C2. The AC output terminals of the three single phase five-level inverter topologies are respectively connected to three phases of AC utilities or AC load.

The circuit module M1 of the single phase five-level inverter topology in FIG. 26(a) can employ any one shown in from FIG. 2 to FIG. 6. Each circuit module M2 of the single phase five-level inverter topologies in FIG. 26(a) can employ any one shown in from FIG. 19 to FIG. 22. The two circuit modules M2 of the single phase five-level inverter topologies in FIG. 26(a) with the same circuits are given top priority to be integrated flexibly. For example, they all use the circuit module M2 shown in FIG. 19.

Figure 26B:
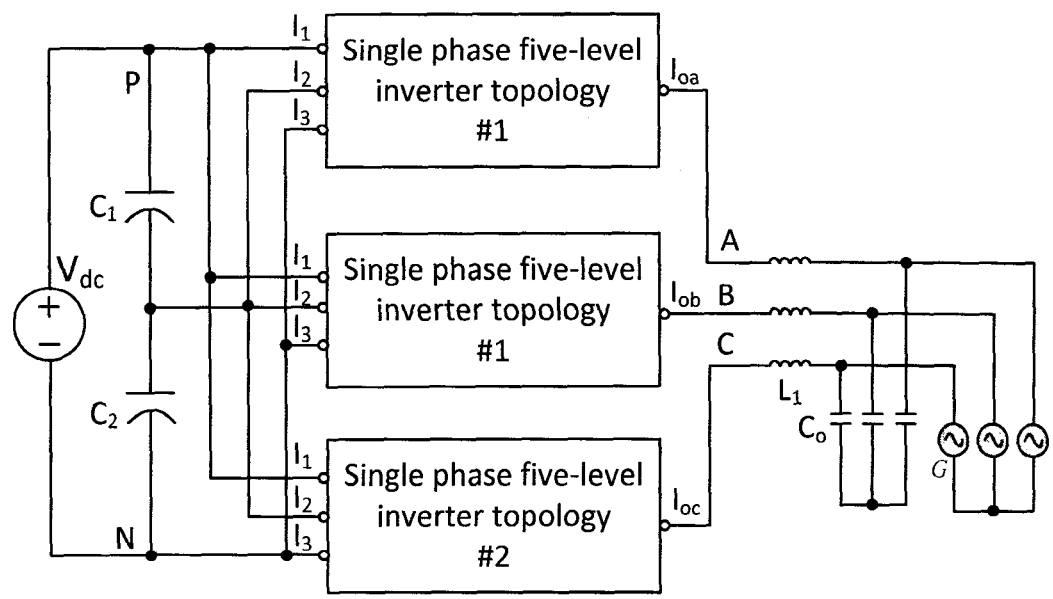

FIG. 26(b) is the circuit diagram in partial block form of a fourth kind of three-phase five-level inverter topology based on the equivalent circuit in FIG. 24(a) and FIG. 25(a). As shown in FIG. 26(b), it comprises two of the first kind of single phase five-level inverter topologies and one of the second kind of single phase five-level inverter topology. The three single phase five-level inverter topologies are connected in parallel at their input sides. That is to say, all the first DC input terminals are connected to the positive terminal of the first capacitor C1; all the second DC input terminals are connected to the common terminal of the first capacitor C1 and the second capacitor C2; and all the third DC input terminals are connected to the negative terminal of the second capacitor C2. The AC output terminals of the three single phase five-level inverter topologies are respectively connected to three phases of AC utilities or AC load.

Each circuit module M1 of the single phase five-level inverter topologies in FIG. 26(b) can employ any one shown in from FIG. 2 to FIG. 6. The circuit module M2 of the single phase five-level inverter topology in FIG. 26(b) can employ any one shown in from FIG. 19 to FIG. 22. The two circuit modules M1 with the same circuits are given top priority to be integrated flexibly. For example, they all use the circuit module M1 shown in FIG. 2.

It is noted that three-phase AC voltage is widely used. They are shown as an example in this specification. It is understood that other multiple phase configurations, such as four-phase, five-phase, etc., AC voltage can also be generated using the same method as described here. This can be appreciated by any person in the field of art.

The voltage utilization ratio of the three-phase five-level inverter in the invention is twice that of the present three-phase five-level half-bridge inverter under the same operating conditions, so the current is reduced to half of the latter. Because of the low current, the cost for the elements in the inverter is reduced, and the AC filtering inductance is smaller than that of the three-level half-bridge inverter for the same filtering effect. The mid-point voltage between the first capacitor C1 and the second capacitor C2 is balanced as they alternatively charging the floating capacitor with an equality of opportunity. That is to say, the DC link mid-point voltage can be balanced without additional circuitry.

The five-level inverter topology provided in the invention can be used for, but not limited to, renewable energy power system, such as single-phase or three-phase photovoltaic system, as well as three-phase motor drive.

Each embodiment in the part of the detailed description of the embodiments goes forward one by one. The differences among the embodiments are focused on, and the same or similar among all the embodiments is easy to be understood by making a cross-reference.

Note that the relationship terms like "first", "second" and so on are used in the invention just for the sake of description and not to indicate any real relationship or sequence among them.

While the invention has been described with respect to illustrative embodiments thereof, it will be understood that various changes may be made to the embodiments without departing from the scope of the invention. Accordingly, the described embodiments are to be considered merely exemplary and the invention is not to be limited thereby.

The invention claimed is:

1. A single phase five-level inverter topology for use with a first DC power supply and a second DC power supply connected in series, comprising a half-bridge inverter circuit that outputs five mutually different voltage levels including zero;
   wherein the half-bridge inverter circuit comprises a floating capacitor, a circuit module, a first switching circuit branch, a second switching circuit branch, a third switching circuit branch, a fourth switching circuit branch, a fifth switching circuit branch and a sixth switching circuit branch;
   the circuit module in the half-bridge inverter circuit comprises a first terminal, a second terminal, a third terminal, a fourth terminal and a fifth terminal;
   the first terminal of the circuit module is connected to a common terminal of the first DC power supply and the second DC power supply;
   the fourth terminal of the circuit module is connected to a positive terminal of the first DC power supply;
   the fifth terminal of the circuit module is connected to a negative terminal of the second DC power supply;
   a first terminal of the first switching circuit branch is connected to the positive terminal of the first DC power supply;

a second terminal of the first switching circuit branch is connected to a first terminal of the second switching circuit branch;

a second terminal of the second switching circuit branch is connected to the negative terminal of the second DC power supply;

a first terminal of the third switching circuit branch is connected to both the second terminal of the circuit module and a positive terminal of the floating capacitor;

a second terminal of the third switching circuit branch is connected to a first terminal of the fourth switching circuit branch;

a second terminal of the fourth switching circuit branch is connected to both the third terminal of the circuit module and a negative terminal of the floating capacitor;

a common terminal of the third switching circuit branch and the fourth switching circuit branch is connected to a common terminal of the first switching circuit branch and the second switching circuit branch;

a first terminal of the fifth switching circuit branch is connected to the positive terminal of the floating capacitor;

a second terminal of the fifth switching circuit branch is connected to a first terminal of the sixth switching circuit branch;

a second terminal of the sixth switching circuit branch is connected to the negative terminal of the floating capacitor;

a common terminal of the fifth switching circuit branch and the sixth switching circuit branch is connected to a first terminal of AC utilities or AC load.

2. The single phase five-level inverter topology of claim 1, further comprises a first inductor; wherein the first inductor is connected between the common terminal of the fifth and the sixth switching circuit branches and the first terminal of AC utilities or AC load.

3. The single phase five-level inverter topology of claim 2, wherein:
the first switching circuit branch comprises a first bidirectional switch;
the second switching circuit branch comprises a second bidirectional switch;
the third switching circuit branch comprises a third bidirectional switch;
the fourth switching circuit branch comprises a fourth bidirectional switch;
the fifth switching circuit branch comprises a fifth bidirectional switch;
the sixth switching circuit branch comprises a sixth bidirectional switch;
a first terminal of each bidirectional switch is connected to the first terminal of the switching circuit branch in which it is located;
a second terminal of each bidirectional switch is connected to the second terminal of the switching circuit branch in which it is located.

4. The single phase five-level inverter topology of claim 3, wherein the common terminal of the first DC power supply and the second DC power supply is connected to a second terminal of AC utilities or AC load.

5. The single phase five-level inverter topology of claim 4, wherein a seventh circuit branch which is connected between the first terminal of the circuit module and the second terminal of the circuit module or between the first terminal of the circuit module and the third terminal of the circuit module, comprises at least one bidirectional switch.

6. The single phase five-level inverter topology of claim 5, wherein the circuit module further comprises a current limiting device.

7. The single phase five-level inverter topology of claim 6, wherein the current limiting device is an inductor, or a resistor, or a semiconductor device, or a combination of them, operated at active mode or linear mode.

8. The single phase five-level inverter topology of claim 3, wherein the circuit module comprises a second inductor, a seventh bidirectional switch, an eighth bidirectional switch, a first diode, a second diode, a third diode and a fourth diode;
a cathode of the first diode is connected to the fourth terminal of the circuit module;
an anode of the first diode is connected to a cathode of the second diode;
an anode of the second diode is connected to the fifth terminal of the circuit module;
a first terminal of the second inductor is connected to the first terminal of the circuit module and a second terminal of the second inductor is connected to a common terminal of the first and the second diodes;
an anode of the third diode is connected to the anode of the first diode;
a cathode of the third diode is connected to a first terminal of the seventh bidirectional switch;
a second terminal of the seventh bidirectional switch is connected to the second terminal of the circuit module;
a cathode of the fourth diode is connected to the cathode of the second diode;
an anode of the fourth diode is connected to a second terminal of the eighth bidirectional switch;
a first terminal of the eighth bidirectional switch is connected to the third terminal of the circuit module.

9. The single phase five-level inverter topology of claim 3, wherein the circuit module comprises a second inductor, a seventh bidirectional switch, a first diode, a second diode, a third diode, a fourth diode, a fifth diode and a sixth diode;
a cathode of the first diode is connected to the fourth terminal of the circuit module;
an anode of the first diode is connected to a cathode of the second diode;
an anode of the second diode is connected to a cathode of the third diode;
an anode of the third diode is connected to a cathode of the fourth diode;
an anode of the fourth diode is connected to the fifth terminal of the circuit module;
a first terminal of the second inductor is connected to the first terminal of the circuit module and a second terminal of the second inductor is connected to a common terminal of the third and the second diodes;
a cathode of the fifth diode is connected to both the cathode of the second diode and a first terminal of the seventh bidirectional switch;
an anode of the fifth diode is connected to the third terminal of the circuit module;
a anode of the sixth diode is connected to both the anode of the third diode and a second terminal of the seventh bidirectional switch;
a cathode of the sixth diode is connected to the second terminal of the circuit module.

10. The single phase five-level inverter topology of claim 3, wherein the circuit module comprises a second inductor, a seventh bidirectional switch, an eighth bidirectional switch, a ninth bidirectional switch, a tenth bidirectional switch, a first diode and a second diode;
  a cathode of the first diode is connected to the fourth terminal of the circuit module;
  an anode of the first diode is connected to a cathode of the second diode;
  an anode of the second diode is connected to the fifth terminal of the circuit module;
  a first terminal of the second inductor is connected to the first terminal of the circuit module and a second terminal of the second inductor is connected to a common terminal of the first and the second diodes;
  a second terminal of the seventh bidirectional switch is connected to the anode of the first diode;
  a first terminal of the seventh bidirectional switch is connected to a first terminal of the eighth bidirectional switch;
  a second terminal of the eighth bidirectional switch is connected to the second terminal of the circuit module;
  a first terminal of the ninth bidirectional switch is connected to the cathode of the second diode;
  a second terminal of the ninth bidirectional switch is connected to a second terminal of the tenth bidirectional switch; a first terminal of the tenth bidirectional switch is connected to the third terminal of the circuit module.

11. The single phase five-level inverter topology of claim 3, wherein the circuit module comprises a second inductor, a seventh bidirectional switch, an eighth bidirectional switch, a first diode, a second diode, a third diode, a fourth diode, a fifth diode, a sixth diode, a seventh diode, an eighth diode, a ninth diode and a tenth diode;
  a cathode of the first diode is connected to the fourth terminal of the circuit module;
  an anode of the first diode is connected to a cathode of the second diode;
  an anode of the second diode is connected to the fifth terminal of the circuit module;
  a first terminal of the second inductor is connected to the first terminal of the circuit module and a second terminal of the second inductor is connected to a common terminal of the first and the second diodes;
  a cathode of the third diode is connected to both a cathode of the fifth diode and a first terminal of the seventh bidirectional switch;
  an anode of the third diode is connected to a cathode of the fourth diode;
  an anode of the fourth diode is connected to both an anode of the sixth diode and a second terminal of the seventh bidirectional switch;
  a common terminal of the third and the fourth diodes is connected to the anode of the first diode;
  an anode of the fifth diode is connected to a cathode of the sixth diode;
  a common terminal of the fifth and the sixth diodes is connected to the second terminal of the circuit module;
  a cathode of the seventh diode is connected to both a cathode of the ninth diode and a first terminal of the eighth bidirectional switch;
  an anode of the seventh diode is connected to a cathode of the eighth diode;
  an anode of the eighth diode is connected to both an anode of the tenth diode and a second terminal of the eighth bidirectional switch;
  a common terminal of the seventh and the eighth diodes is connected to the cathode of the second diode;
  an anode of the ninth diode is connected to a cathode of the tenth diode;
  a common terminal of the ninth and the tenth diodes is connected to the third terminal of the circuit module.

12. The single phase five-level inverter topology of claim 3, wherein the circuit module comprises a second inductor, a seventh bidirectional switch, an eighth bidirectional switch, a first diode, a second diode, a third diode, a fourth diode, a fifth diode, a sixth diode, a seventh diode, an eighth diode, a ninth diode and a tenth diode;
  a cathode of the first diode is connected to the fourth terminal of the circuit module;
  an anode of the first diode is connected to a cathode of the third diode;
  an anode of the third diode is connected to a cathode of the fourth diode;
  the cathode of the third diode is connected to both a cathode of the fifth diode and a first terminal of the seventh bidirectional switch;
  an anode of the fourth diode is connected to both an anode of the sixth diode and a second terminal of the seventh bidirectional switch;
  an anode of the fifth diode is connected to a cathode of the sixth diode;
  a common terminal of the fifth and the sixth diodes is connected to the second terminal of the circuit module;
  a cathode of the seventh diode is connected to both a cathode of the ninth diode and a first terminal of the eighth bidirectional switch;
  an anode of the seventh diode is connected to a cathode of the eighth diode;
  an anode of the eighth diode is connected to both an anode of the tenth diode and a second terminal of the eighth bidirectional switch;
  an anode of the ninth diode is connected to a cathode of the tenth diode;
  a common terminal of the ninth and the tenth diodes is connected to the third terminal of the circuit module;
  the anode of the eighth diode is connected to a cathode of the second diode;
  an anode of the second diode is connected to the fifth terminal of the circuit module;
  a first terminal of the second inductor is connected to the first terminal of the circuit module and a second terminal of the second inductor is connected to both a common terminal of the third and the fourth diodes and a common terminal of the seventh and the eighth diodes.

13. A three-phase five-level inverter topology, comprising three single phase five-level inverter topologies of claim 6; wherein the three single phase five-level inverter topologies are connected in parallel at their input sides; AC output terminals of the three single phase five-level inverter topologies are respectively connected to three phases of AC utilities or AC load.

14. A single phase five-level inverter topology for use with a first DC power supply and a second DC power supply connected in series two, comprising a half-bridge inverter circuit that outputs five mutually different voltage levels including zero;
  wherein the half-bridge inverter circuit comprises a floating capacitor, a circuit module, a first switching circuit branch, a second switching circuit branch, a third switching circuit branch, a fourth switching circuit branch, a fifth switching circuit branch and a sixth switching circuit branch;

the circuit module in the half-bridge inverter circuit
comprises a first terminal, a second terminal and a third
terminal;

the first terminal of the circuit module is connected to a
common terminal of the first DC power supply and the
second DC power supply;

a first terminal of the first switching circuit branch is
connected to a positive terminal of the first DC power
supply;

a second terminal of the first switching circuit branch is
connected to a first terminal of the second switching
circuit branch;

a second terminal of the second switching circuit branch
is connected to a negative terminal of the second DC
power supply;

a first terminal of the third switching circuit branch is
connected to both the second terminal of the circuit
module and a positive terminal of the floating capacitor;

a second terminal of the third switching circuit branch is
connected to a first terminal of the fourth switching
circuit branch;

a second terminal of the fourth switching circuit branch is
connected to both the third terminal of the circuit
module and a negative terminal of the floating capacitor;

a common terminal of the third switching circuit branch
and the fourth switching circuit branch is connected to
a common terminal of the first switching circuit branch
and the second switching circuit branch;

a first terminal of the fifth switching circuit branch is
connected to the positive terminal of the floating
capacitor;

a second terminal of the fifth switching circuit branch is
connected to a first terminal of the sixth switching
circuit branch;

a second terminal of the sixth switching circuit branch is
connected to the negative terminal of the floating
capacitor;

a common terminal of the fifth switching circuit branch
and the sixth switching circuit branch is connected to a
first terminal of AC utilities or AC load.

15. The single phase five-level inverter topology of claim 14, further comprises a first inductor; wherein the first inductor is connected between the common terminal of the fifth and the sixth switching circuit branches and the first terminal of AC utilities or AC load.

16. The single phase five-level inverter topology of claim 15, wherein:

the first switching circuit branch comprises a first bidirectional switch;

the second switching circuit branch comprises a second bidirectional switch;

the third switching circuit branch comprises a third bidirectional switch;

the fourth switching circuit branch comprises a fourth bidirectional switch;

the fifth switching circuit branch comprises a fifth bidirectional switch;

the sixth switching circuit branch comprises a sixth bidirectional switch;

a first terminal of each bidirectional switch is connected to the first terminal of the switching circuit branch in which it is located;

a second terminal of each bidirectional switch is connected to the second terminal of the switching circuit branch in which it is located.

17. The single phase five-level inverter topology of claim 16, wherein the common terminal of the first DC power supply and the second DC power supply is connected to a second terminal of AC utilities or AC load.

18. The single phase five-level inverter topology of claim 17, wherein a seventh circuit branch which is connected between the first terminal of the circuit module and the second terminal of the circuit module or between the first terminal of the circuit module and the third terminal of the circuit module, comprises at least one bidirectional switch.

19. The single phase five-level inverter topology of claim 18, wherein the circuit module further comprises a current limiting device.

20. The single phase five-level inverter topology of claim 19, wherein the current limiting device is an inductor, or a resistor, or a semiconductor device, or a combination of them, operated at active mode or linear mode.

21. The single phase five-level inverter topology of claim 16, wherein the circuit module comprises a second inductor, a seventh bidirectional switch, an eighth bidirectional switch, a ninth bidirectional switch, a tenth bidirectional switch, a first diode and a second diode;

a first terminal of the seventh bidirectional switch is connected to both a first terminal of the ninth bidirectional switch and a cathode of the first diode;

a second terminal of the ninth bidirectional switch is connected to the second terminal of the circuit module;

a second terminal of the seventh bidirectional switch is connected to a first terminal of the eighth bidirectional switch;

a second terminal of the eighth bidirectional switch is connected to both an anode of the second diode and a second terminal of the tenth bidirectional switch;

a first terminal of the tenth bidirectional switch is connected to the third terminal of the circuit module;

an anode of the first diode is connected to a cathode of the second diode;

a first terminal of the second inductor is connected to both a common terminal of the seventh and the eighth bidirectional switches and the first terminal of the circuit module, and a second terminal of the second inductor is connected to a common terminal of the first and the second diodes.

22. The single phase five-level inverter topology of claim 16, wherein the circuit module comprises a second inductor, a seventh bidirectional switch, an eighth bidirectional switch, a ninth bidirectional switch, a first diode, a second diode, a third diode and a fourth diode;

a first terminal of the seventh bidirectional switch is connected to both a first terminal of the ninth bidirectional switch and a cathode of the first diode;

a second terminal of the seventh bidirectional switch is connected to a first terminal of the eighth bidirectional switch;

a second terminal of the eighth bidirectional switch is connected to both an anode of the second diode and a second terminal of the ninth bidirectional switch;

an anode of the first diode is connected to a cathode of the second diode;

a cathode of the third diode is connected to the first terminal of the ninth bidirectional switch;

an anode of the third diode is connected to the third terminal of the circuit module;

an anode of the fourth diode is connected to the second terminal of the ninth bidirectional switch;

a cathode of the fourth diode is connected to the second terminal of the circuit module;

a first terminal of the second inductor is connected to both a common terminal of the seventh and the eighth bidirectional switches and the first terminal of the circuit module, and a second terminal of the second inductor is connected to a common terminal of the first and the second diodes.

23. The single phase five-level inverter topology of claim 16, wherein the circuit module comprises a second inductor, a seventh bidirectional switch, an eighth bidirectional switch, a ninth bidirectional switch, a tenth bidirectional switch, an eleventh bidirectional switch and a twelfth bidirectional switch;
- a first terminal of the seventh bidirectional switch is connected to both a first terminal of the ninth bidirectional switch and a first terminal of the eleventh bidirectional switch;
- a second terminal of the seventh bidirectional switch is connected to a first terminal of the eighth bidirectional switch;
- a second terminal of the eighth bidirectional switch is connected to both a second terminal of the tenth bidirectional switch and a second terminal of the twelfth bidirectional switch;
- a second terminal of the ninth bidirectional switch is connected to a first terminal of the tenth bidirectional switch;
- a second terminal of the eleventh bidirectional switch is connected to the second terminal of the circuit module;
- a first terminal of the twelfth bidirectional switch is connected to the third terminal of the circuit module;
- a first terminal of the second inductor is connected to both a common terminal of the seventh and the eighth bidirectional switches and the first terminal of the circuit module, and a second terminal of the second inductor is connected to a common terminal of the ninth and the tenth bidirectional switches.

24. The single phase five-level inverter topology of claim 16, wherein the circuit module comprises a second inductor, a seventh bidirectional switch, an eighth bidirectional switch, a ninth bidirectional switch, an tenth bidirectional switch, a first diode, a second diode, a third diode, a fourth diode, a fifth diode, a sixth diode, a seventh diode and an eighth diode;
- a first terminal of the seventh bidirectional switch is connected to both a first terminal of the ninth bidirectional switch and a cathode of the first diode;
- a second terminal of the seventh bidirectional switch is connected to a first terminal of the eighth bidirectional switch;
- a second terminal of the eighth bidirectional switch is connected to both a second terminal of the tenth bidirectional switch and an anode of the sixth diode;
- an anode of the first diode is connected to a cathode of the second diode;
- an anode of the second diode is connected to both an anode of the fourth diode and a second terminal of the ninth bidirectional switch;
- a cathode of the third diode is connected to the first terminal of the ninth bidirectional switch;
- an anode of the third diode is connected to both a cathode of the fourth diode and the second terminal of the circuit module;
- a cathode of the fifth diode is connected to both a first terminal of the tenth bidirectional switch and a cathode of the seventh diode;
- an anode of the fifth diode is connected to a cathode of the sixth diode;
- the cathode of the seventh diode is connected to the first terminal of the tenth bidirectional switch;
- an anode of the seventh diode is connected to both a cathode of the eighth diode and the third terminal of the circuit module;
- an anode of the eighth diode is connected to the second terminal of the tenth bidirectional switch;
- a first terminal of the second inductor is connected to both the first terminal of the circuit module and a common terminal of the seventh and the eighth bidirectional switches, and a second terminal of the second inductor is connected to both a common terminal of the first and the second diodes and a common terminal of the fifth and the sixth diodes.

25. A three-phase five-level inverter topology, comprising three single phase five-level inverter topologies of claim 19; wherein the three single phase five-level inverter topologies are connected in parallel at their input sides; AC output terminals of the three single phase five-level inverter topologies are respectively connected to three phases of AC utilities or AC load.

* * * * *